(12) United States Patent
Jiang et al.

(10) Patent No.: US 12,002,239 B2
(45) Date of Patent: Jun. 4, 2024

(54) DATA PROCESSING METHOD AND DEVICE USED IN VIRTUAL SCENARIO

(71) Applicant: HUAWEI TECHNOLOGIES CO., LTD., Guangdong (CN)

(72) Inventors: Jun Jiang, Shenzhen (CN); Xiaowei Liu, Shenzhen (CN); Weiteng Feng, Shenzhen (CN); Yunneng Mo, Shenzhen (CN); Zongwu Wu, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 542 days.

(21) Appl. No.: 17/230,102

(22) Filed: Apr. 14, 2021

(65) Prior Publication Data

US 2021/0233272 A1    Jul. 29, 2021

Related U.S. Application Data

(63) Continuation of application No. PCT/CN2019/110330, filed on Oct. 10, 2019.

(30) Foreign Application Priority Data

Oct. 15, 2018    (CN) .......................... 201811201612.1

(51) Int. Cl.
*G06T 7/73*    (2017.01)
*G09G 5/12*    (2006.01)

(52) U.S. Cl.
CPC ................. *G06T 7/74* (2017.01); *G09G 5/12* (2013.01); *G06T 2207/10028* (2013.01); *G06T 2207/30244* (2013.01)

(58) Field of Classification Search
CPC ............. G06T 7/74; G06T 2207/10028; G06T 2207/30244; G06T 2200/28;
(Continued)

(56) References Cited

U.S. PATENT DOCUMENTS 9,612,123 B1 *    4/2017    Levinson ............. G05D 1/0297
9,858,669 B2    1/2018    Aughey
(Continued)

FOREIGN PATENT DOCUMENTS

CN    102939139 A    2/2013
CN    105528082 A    4/2016
(Continued)

OTHER PUBLICATIONS

Ruwan Egodagamage et al, A collaborative Augmented Reality framework based on Distributed Visual SLAM, 2017 International Conference on Cyberworlds, 2017, 8 pages.

*Primary Examiner* — Ali Bayat
(74) *Attorney, Agent, or Firm* — WOMBLE BOND DICKINSON (US) LLP

(57) ABSTRACT

This application provides a data processing method and device. The method includes: collecting a first image by using a camera; obtaining first point cloud data of the object based on the first image, where the first point cloud data indicates three-dimensional coordinate values of a surface point of the object in a first camera coordinate system of the first terminal; obtaining pose data of the first terminal in the first camera coordinate system based on the first image; obtaining a two-dimensional feature image based on the pose data, the first point cloud data, and the first image; generating map data based on the first point cloud data, the pose data, and the two-dimensional feature image; and sending the map data to a second terminal or a server.

18 Claims, 10 Drawing Sheets

(58) Field of Classification Search
CPC .......... G06T 2207/10021; G06T 7/292; G06T 19/00; G06T 7/80; G09G 5/12; G06F 16/29
USPC ........................................................ 382/285
See application file for complete search history.

(56) References Cited

U.S. PATENT DOCUMENTS

| | | | |
|---|---|---|---|
| 2010/0287485 A1 | 11/2010 | Bertolami et al. | |
| 2014/0267234 A1* | 9/2014 | Hook .................... | G06T 19/006 345/419 |
| 2017/0248963 A1* | 8/2017 | Levinson ................ | B60R 21/01 |
| 2018/0012371 A1 | 1/2018 | Klingner et al. | |
| 2020/0068345 A1* | 2/2020 | Ondruska ............. | H04W 4/023 |
| 2020/0109954 A1* | 4/2020 | Li ....................... | G01C 21/3852 |
| 2021/0144513 A1* | 5/2021 | Ondruska ............ | H04W 4/023 |
| 2021/0180984 A1* | 6/2021 | Xu ..................... | G01C 21/3694 |

FOREIGN PATENT DOCUMENTS

| | | |
|---|---|---|
| CN | 106355647 A | 1/2017 |
| CN | 107153831 A | 9/2017 |
| CN | 107223269 A | 9/2017 |
| CN | 107230225 A | 10/2017 |
| CN | 107748569 A | 3/2018 |
| CN | 107820593 A | 3/2018 |
| CN | 107885871 A | 4/2018 |
| CN | 108389264 A | 8/2018 |
| CN | 109949422 A | 6/2019 |
| WO | 2017041731 A1 | 3/2017 |

\* cited by examiner

DATA PROCESSING METHOD AND DEVICE USED IN VIRTUAL SCENARIO

CROSS-REFERENCE TO RELATED APPLICATIONS

This application is a continuation of International Patent Application No. PCT/CN2019/110330, filed on Oct. 10, 2019, which claims priority to Chinese Patent Application No. 201811201612.1, filed on Oct. 15, 2018. The disclosures of the aforementioned applications are hereby incorporated by reference in their entireties.

TECHNICAL FIELD

The present disclosure relates to the field of virtual scenario technologies, and in particular, to a data processing method and device used in a virtual scenario.

BACKGROUND

Virtual reality (VR), augmented reality (AR), and mixed reality (MR) technologies are emerging multimedia virtual scenario technologies in recent years. The VR technology is a simulation technology that can be used to create and experience a virtual world. The AR technology is a technology that can be used to superimpose a virtual reality and a real world and enable the virtual reality and the real world to interact with each other. The MR technology is a comprehensive technology that is used to establish an interactive feedback information loop among a real world, a virtual world, and a user in a new visual environment generated by combining the real world and the virtual world.

In the foregoing virtual scenario technology, a simultaneous localization and mapping (SLAM) technology is usually used by a terminal to perform self-positioning in an environment. The SLAM technology may implement that in a moving process in which a terminal (for example, a mobile terminal such as a mobile phone or VR glasses) starts to move from an unknown location in an environment, the terminal performs self-positioning based on a location estimation and a map, and constructs an incremental map based on the self-positioning for subsequent positioning. A system or a module using the SLAM technology may also be referred to as a spatial positioning engine.

In a virtual scenario of multi-user interaction, different mobile terminals may have different types or models (for example, a mobile phone and VR glasses, or an Apple mobile phone and a Huawei mobile phone), and also have different spatial positioning engine algorithms. Coordinate system synchronization (content synchronization) between different mobile terminals is a core technology. Coordinate system synchronization can implement sharing and interaction of virtual content in a multi-user VR, AR, or MR application in a same coordinate system space.

An existing solution is to implement coordinate system synchronization based on a regular geometric plane (for example, a square desktop). For example, a mobile terminal uses calculated coordinates of a central point of a horizontal desktop at a current location as an origin of a reference coordinate system of the terminal. Then, coordinate axes of the reference coordinate system are calculated by using desktop edge information. Further, the reference coordinate system of the terminal is established. Mobile terminals of different users have a calculation process, and therefore a same reference coordinate system is established. In this way, a pose of the terminal relative to the reference coordinate system may be calculated by using a pose output by a spatial positioning engine of the mobile terminal, and then a relative pose between terminals is calculated, to implement coordinate system synchronization. This solution can implement multi-user VR, AR, or MR application interaction on a same desktop by using different types of mobile terminals.

Because this solution depends on a regular geometric plane, an application scenario is limited. In an irregular geometric plane scenario or a non-plane scenario, this solution cannot implement coordinate system synchronization.

SUMMARY

Embodiments of the present disclosure provide a data processing method and device used in a virtual scenario. Terminals of different types can implement, across platforms in any natural scenario, coordinate system synchronization (content synchronization) in the virtual scenario, and the embodiments of the present disclosure are compatible with various spatial positioning engines, thereby meeting a user requirement.

According to a first aspect, an embodiment of the present disclosure provides a data processing method used in a virtual scenario. The virtual scenario is one of a virtual reality VR scenario, an augmented reality AR scenario, and a mixed reality MR scenario. The method includes: collecting, by a first terminal, a first image by using a camera, where the first image includes an image of any object in any natural environment (real world); obtaining, by the first terminal, first point cloud data of the object based on the first image, where the first point cloud data indicates three-dimensional coordinate values of a surface point of the object in a first camera coordinate system of the first terminal; obtaining, by the first terminal, pose data of the first terminal in the first camera coordinate system based on the first image; obtaining, by the first terminal, a two-dimensional feature image based on the pose data, the first point cloud data, and the first image; generating, by the first terminal, map data based on the first point cloud data, the pose data, and the two-dimensional feature image; and sending, by the first terminal, the map data to a second terminal or a server.

When the first terminal sends the map data to the second terminal, the second terminal may be configured to synchronize content in the virtual scenario based on the map data. Spatial positioning engines used by the first terminal and the second terminal may be different or may be the same.

When the first terminal sends the map data to the server, the server is configured to obtain coordinate system transformation data between the first camera coordinate system of the first terminal and a second camera coordinate system of the second terminal based on the map data, and send the coordinate system transformation data to the second terminal, so that the second terminal synchronizes content in the virtual scenario based on the coordinate system transformation data. Spatial positioning engines used by the first terminal and the second terminal may be different or may be the same.

It can be learned that, in an embodiment of the present disclosure, the first terminal can extract an image feature by using output data of a local spatial positioning engine, generate the map data, and send the map data to the second terminal or the server, so that the second terminal implements coordinate system synchronization between the two terminals based on the map data. Spatial positioning engines used by the first terminal and the second terminal may be different. For example, even if different spatial positioning engines are installed on different terminals, content synchronization in the virtual scenario can still be implemented. This helps implement cross-platform and multi-person sharing AR/VR/MR development and application between different spatial positioning engines, meets a user requirement, and improves user experience.

It may be further learned that, in an embodiment of the present disclosure, feature extraction can be performed on any object in any natural scenario in an effective feature extraction manner, so as to implement coordinate system synchronization between different terminals. Therefore, a multi-person sharing AR application scenario is not limited by the environment. For example, in a process of implementing interaction in a multi-user virtual scenario, there is no need to relay on a geometrical object, and the multi-person sharing AR/VR/MR application is no longer affected by the environment, thereby meeting requirements of various application scenarios.

Based on the first aspect, in an embodiment, the obtaining, by the first terminal, a two-dimensional feature image based on the pose data, the first point cloud data, and the first image includes: projecting, by the first terminal, the first point cloud data onto the first image based on the pose data, to obtain two-dimensional image coordinates (also referred to as 2D image coordinates) that are corresponding to the first point cloud data and that are in an image coordinate system of the first image; and extracting the two-dimensional feature image (also referred to as a 2D feature image) based on an image block or an image feature point descriptor, where the image block or the image feature point descriptor is corresponding to the two-dimensional image coordinates and is in the first image. The image feature point descriptor includes but is not limited to one of Brief, Brisk, ORB, Freak, SIFT, and SURF.

In an embodiment, the first terminal may select, at a preset time interval, one frame of image (the first image), and pose data and first point cloud data that have a same timestamp and that are output by the spatial positioning engine, project the first point cloud data onto the first image by using the pose data, to obtain the 2D image coordinates, and then provide a 2D feature description of the 2D image coordinates. The feature description may be an image feature point descriptor description or an image block description. The image feature point descriptor includes but is not limited to one of Brief, Brisk, ORB, Freak, SIFT, and SURF. In this way, 2D feature images that are corresponding to the image and that have a same timestamp may be obtained. In an embodiment, a set of the 2D feature image, the first point cloud data, and the pose data that are associated with a same timestamp of the first terminal may be set as a key frame of the first terminal.

Based on the first aspect, in an embodiment, the spatial positioning engine of the first terminal may obtain, through calculation, the pose data of the first terminal in the first camera coordinate system based on data (the first image) collected by the camera.

In an embodiment, an inertial measurement unit (IMU) sensor is further disposed in the first terminal. In this case, an input signal of the spatial positioning engine includes image data collected by the camera and data (which may be referred to as motion data) collected by the IMU sensor. The spatial positioning engine may obtain, through calculation, the pose data of the first terminal in the first camera coordinate system based on the image data and the motion data.

In an embodiment, in addition to the camera and the IMU, a positioning module (e.g., GPS positioning, BeiDou positioning, Wi-Fi positioning, base station positioning, or the like, and for details, refer to the following description of a terminal structure) related to a pose or motion is further disposed in the first terminal. In this case, the spatial positioning engine may further obtain, through calculation, the pose data of the first terminal in the first camera coordinate system with reference to data collected by the positioning module.

Based on the first aspect, in an embodiment, before the generating, by the first terminal, map data based on the first point cloud data, the pose data, and the two-dimensional feature image, the method further includes: obtaining, by the first terminal, positioning data, where the positioning data includes at least one of GPS positioning data of the terminal, BeiDou positioning data of the first terminal, Wi-Fi positioning data of the first terminal, Bluetooth positioning data of the first terminal, or base station positioning data of the first terminal. Then, the positioning data and the map data are packetized into a data packet for subsequent sending. Alternatively, the positioning data may be carried in the map data for subsequent sending.

According to a second aspect, an embodiment of the present disclosure provides another data processing method used in a virtual scenario. The virtual scenario is one of a virtual reality VR scenario, an augmented reality AR scenario, and a mixed reality MR scenario. The method includes: receiving, by a second terminal, map data sent by a first terminal, where the map data is generated based on first point cloud data of any object, pose data of the first terminal in a first camera coordinate system of the first terminal, and a two-dimensional feature image of the first terminal, and the first point cloud data indicates three-dimensional coordinate values of a surface point of the object in the first camera coordinate system of the first terminal; obtaining, by the second terminal, pose data of the second terminal in a second camera coordinate system of the second terminal; obtaining, by the second terminal, a two-dimensional feature image of the second terminal; obtaining, by the second terminal, coordinate system transformation data between the first camera coordinate system and the second camera coordinate system based on the map data, the pose data of the second terminal in the second camera coordinate system, and the two-dimensional feature image of the second terminal; and synchronizing, by the second terminal, content in the virtual scenario based on the coordinate system transformation data.

It can be learned that, in an embodiment of the present disclosure, the second terminal can extract a two-dimensional image feature by using output data of a local spatial positioning engine, receive the map data sent by the first terminal, obtain the coordinate system transformation data based on the map data, the pose data of the second terminal, and the two-dimensional feature image, and finally implement coordinate system synchronization between the two terminals based on the coordinate system transformation data. Spatial positioning engines used by the first terminal and the second terminal may be different. Even if different spatial positioning engines are installed on different terminals, content synchronization in the virtual scenario can still be implemented. This helps implement cross-platform and multi-person sharing AR/VR/MR development and application between different spatial positioning engines, meets a user requirement, and improves user experience.

It may be further learned that, in an embodiment of the present disclosure, feature extraction can be performed on any object in any natural scenario in an effective feature extraction manner, so as to implement coordinate system synchronization between different terminals. Therefore, a multi-person sharing AR application scenario is not limited by the environment. In a process of implementing interaction in a multi-user virtual scenario, there is no need to relay on a geometrical object, and the multi-person sharing AR/VR/MR application is no longer affected by the environment, thereby meeting requirements of various application scenarios.

Based on the second aspect, in an embodiment, the obtaining, by the second terminal, coordinate system transformation data between the first camera coordinate system and the second camera coordinate system based on the map data, the pose data of the second terminal in the second camera coordinate system, and the two-dimensional feature image of the second terminal includes: performing, by the second terminal, a feature matching operation in the map data by using the two-dimensional feature image of the second terminal, to obtain pose data of the second terminal in the first camera coordinate system; and obtaining, by the second terminal, the coordinate system transformation data between the first camera coordinate system and the second camera coordinate system based on the pose data of the second terminal in the first camera coordinate system and the pose data of the second terminal in the second camera coordinate system.

In an embodiment, the second terminal may select, at a preset time interval, one frame of image (the second image), and pose data and second point cloud data that have a same timestamp and that are output by the spatial positioning engine, project the second point cloud data onto the second image by using the pose data, to obtain the 2D image coordinates, and then provide a 2D feature description of the 2D image coordinates. The feature description may be an image feature point descriptor description or an image block description. The image feature point descriptor includes but is not limited to one of Brief, Brisk, ORB, Freak, SIFT, and SURF. In this way, 2D feature images that are corresponding to the image and that have a same timestamp may be obtained. In an embodiment of the present disclosure, a set of the 2D feature image of the second terminal, the second point cloud data, and the pose data of the second terminal that are associated with a same timestamp of the second terminal may be set as a key frame of the second terminal.

In an embodiment, the second terminal may perform feature matching based on the key frame determined by the second terminal and the received map data, extract a same image feature of the determined key frame and the received map data, and output a feature point matching set, to estimate the pose data of the second terminal relative to the first camera coordinate system. A pose estimation algorithm may be a PNP algorithm. Then, the second terminal obtains the coordinate system transformation data (for example, a coordinate system transformation matrix) between the first camera coordinate system and the second camera coordinate system based on the pose data of the second terminal in the first camera coordinate system and the pose data of the second terminal in the second camera coordinate system. In an embodiment, pose transformation data of an anchor in the virtual scenario may be further calculated subsequently based on the coordinate system transformation matrix.

In an embodiment, the synchronizing, by the second terminal, content in the virtual scenario based on the coordinate system transformation data includes: obtaining, by the second terminal, pose transformation data of an anchor in the virtual scenario based on the coordinate system transformation data; and synchronizing, by the second terminal, the content in the virtual scenario based on the pose transformation data of the anchor.

Based on the second aspect, in an embodiment, before the obtaining, by the second terminal, pose data of the second terminal in a second camera coordinate system of the second terminal, the method includes: collecting, by the second terminal, a second image, where the second image includes an image of the object. Because the second image is obtained by shooting an environment, and both the first terminal and the second terminal are located in the environment, the second image includes the image of the object in the environment, and the object is the object used in the first image collected by the first terminal. The second terminal obtains second point cloud data of the object based on the second image, where the second point cloud data indicates three-dimensional coordinate values of a surface point of the object in the second camera coordinate system.

In an embodiment, the obtaining, by the second terminal, pose data of the second terminal in a second camera coordinate system of the second terminal includes: obtaining, by the second terminal, the pose data of the second terminal in the second camera coordinate system based on the second image.

In an embodiment, the obtaining, by the second terminal, a two-dimensional feature image of the second terminal includes: projecting, by the second terminal, the second point cloud data onto the second image based on the pose data of the second terminal in the second camera coordinate system, to obtain two-dimensional image coordinates that are corresponding to the second point cloud data and that are in an image coordinate system of the second image; and obtaining, by the second terminal, the two-dimensional feature image of the second terminal based on an image block or an image feature point descriptor, where the image block or the image feature point descriptor is corresponding to the two-dimensional image coordinates and is in the second image. The image feature point descriptor includes but is not limited to one of Brief, Brisk, ORB, Freak, SIFT, and SURF.

Based on the second aspect, in an embodiment, the map data further carries positioning data, and the positioning data includes at least one of GPS positioning data of the first terminal, BeiDou positioning data of the first terminal, Wi-Fi positioning data of the first terminal, Bluetooth positioning data of the first terminal, or base station positioning data of the first terminal; and correspondingly, the obtaining, by the second terminal, a two-dimensional feature image of the second terminal includes: determining, by the second terminal, a search scope of the two-dimensional feature image based on the positioning data; and determining the two-dimensional feature image of the second terminal from a plurality of historical two-dimensional feature images based on the search scope.

For example, if a data packet or the map data sent by the first terminal to the second terminal carries the positioning data of the first terminal, in a feature matching process, the second terminal may first determine the search scope of the two-dimensional feature image based on the positioning data, to screen a plurality of key frames generated by the second terminal for a plurality of times based on the search scope, for example, to select a key frame that is closer to or closest to the positioning data; and then perform feature matching in the map data by using the key frame, to obtain the pose data of the second terminal in the first camera coordinate system of the first terminal. This helps improve matching efficiency and accuracy.

According to a third aspect, an embodiment of the present disclosure provides a data processing method used in a virtual scenario. The virtual scenario is one of a virtual reality VR scenario, an augmented reality AR scenario, and a mixed reality MR scenario. The method includes: receiving, by a server, map data sent by a first terminal, where the map data is generated based on first point cloud data of an object, pose data of the first terminal in a first camera coordinate system of the first terminal, and a two-dimensional feature image of the first terminal, and the first point cloud data indicates three-dimensional coordinate values of a surface point of the object in the first camera coordinate system of the first terminal; receiving, by the server, pose data of a second terminal in a second camera coordinate system of the second terminal and a two-dimensional feature image of the second terminal; performing, by the server, a feature matching operation in the map data by using the two-dimensional feature image of the second terminal, to obtain pose data of the second terminal in the first camera coordinate system; obtaining, by the server, coordinate system transformation data between the first camera coordinate system and the second camera coordinate system based on the pose data of the second terminal in the first camera coordinate system and the pose data of the second terminal in the second camera coordinate system; and sending, by the server, the coordinate system transformation data to the second terminal.

It can be learned that, in an embodiment of the present disclosure, different mobile terminals each can extract an image feature of a same type by using output data of a respective spatial positioning engine. The first terminal may further generate the map data and upload the map data to the server, and the second terminal may further generate a key frame and upload the key frame to the server. The server further obtains coordinate system synchronization data based on the key frame and the map data, and delivers the coordinate system synchronization data to the second terminal, to implement coordinate system synchronization between the terminals. For example, even if different spatial positioning engines are installed on different mobile terminals, content synchronization in the virtual scenario can still be implemented. This helps implement cross-platform and multi-person sharing AR/VR/MR development and application between different spatial positioning engines, and improves user experience. In addition, because the server is used as a data exchange node between different terminals, a requirement of content synchronization among a large quantity of terminals can be efficiently met.

It may be further learned that, in an embodiment of the present disclosure, feature extraction can be performed on an object in any scenario in an effective feature extraction manner, so as to implement coordinate system synchronization between different terminals. Therefore, a multi-person sharing AR application scenario is not limited by the environment. For example, in a process of implementing interaction in a multi-user virtual scenario, a geometrical object is not required, and the multi-person sharing AR/VR/MR application is no longer affected by the environment, thereby meeting requirements of various application scenarios.

According to a fourth aspect, an embodiment of the present disclosure provides a data processing terminal used in a virtual scenario. The virtual scenario is one of a virtual reality VR scenario, an augmented reality AR scenario, and a mixed reality MR scenario. The terminal includes: an image obtaining module, configured to collect a first image by using a camera of the terminal, where the first image includes an image of an object; an SLAM module, configured to obtain first point cloud data of the object based on the first image, where the first point cloud data indicates three-dimensional coordinate values of a surface point of the object in a first camera coordinate system of the terminal; where the SLAM module is further configured to obtain pose data of the terminal in the first camera coordinate system based on the first image; a feature extraction module, configured to obtain a two-dimensional feature image based on the pose data, the first point cloud data, and the first image; a map generation module, configured to generate map data based on the first point cloud data, the pose data, and the two-dimensional feature image; and a communications module, configured to send the map data to another terminal or a server.

Based on the fourth aspect, in an embodiment, the feature extraction module is configured to: project the first point cloud data onto the first image based on the pose data, to obtain two-dimensional image coordinates that are corresponding to the first point cloud data and that are in an image coordinate system of the first image; and obtain the two-dimensional feature image based on an image block or an image feature point descriptor, where the image block or the image feature point descriptor is corresponding to the two-dimensional image coordinates and is in the first image.

Based on the fourth aspect, in an embodiment, the SLAM module is configured to: obtain the pose data of the terminal in the first camera coordinate system based on the first image and motion data that is collected by an inertial measurement unit IMU.

Based on the fourth aspect, in an embodiment, the terminal further includes a positioning module, and the positioning module is configured to obtain positioning data, where the positioning data includes at least one of GPS positioning data of the terminal, BeiDou positioning data of the terminal, Wi-Fi positioning data of the terminal, Bluetooth positioning data of the terminal, or base station positioning data of the terminal; and correspondingly, the map data generated by the map generation module further carries the positioning data.

In an embodiment, the functional modules of the terminal may be configured to implement the method described in the first aspect.

According to a fifth aspect, an embodiment of the present disclosure provides a data processing terminal used in a virtual scenario. The virtual scenario is one of a virtual reality VR scenario, an augmented reality AR scenario, and a mixed reality MR scenario. The terminal includes: a communications module, configured to receive map data sent by another terminal, where the map data is generated based on first point cloud data of an object, pose data of the another terminal in a first camera coordinate system of the another terminal, and a two-dimensional feature image of the another terminal, and the first point cloud data indicates three-dimensional coordinate values of a surface point of the object in the first camera coordinate system of the another terminal; an SLAM module, configured to obtain pose data of the terminal in a second camera coordinate system of the terminal; where the SLAM module is further configured to obtain a two-dimensional feature image of the terminal; a coordinate system transformation module, configured to obtain coordinate system transformation data between the first camera coordinate system and the second camera coordinate system based on the map data, the pose data of the terminal in the second camera coordinate system, and the two-dimensional feature image of the terminal; and a content synchronization module, configured to synchronize content in the virtual scenario based on the coordinate system transformation data.

Based on the fifth aspect, in an embodiment, the coordinate system transformation module is configured to perform a feature matching operation in the map data by using the two-dimensional feature image of the terminal, to obtain pose data of the terminal in the first camera coordinate system; and obtain the coordinate system transformation data between the first camera coordinate system and the second camera coordinate system based on the pose data of the terminal in the first camera coordinate system and the pose data of the terminal in the second camera coordinate system.

Based on the fifth aspect, in an embodiment, the terminal further includes an image obtaining module, and the image obtaining module is configured to collect a second image by using a camera, where the second image includes an image of the object; the SLAM module is further configured to obtain second point cloud data of the object based on the second image, where the second point cloud data indicates three-dimensional coordinate values of a surface point of the object in the second camera coordinate system; the SLAM module is configured to obtain the pose data of the terminal in the second camera coordinate system based on the second image; and the SLAM module is further configured to project the second point cloud data onto the second image based on the pose data of the terminal in the second camera coordinate system, to obtain two-dimensional image coordinates that are corresponding to the second point cloud data and that are in an image coordinate system of the second image; and obtain the two-dimensional feature image of the terminal based on an image block or an image feature point descriptor, where the image block or the image feature point descriptor is corresponding to the two-dimensional image coordinates and is in the second image.

Based on the fifth aspect, in an embodiment, the content synchronization module is configured to: obtain pose transformation data of an anchor in the virtual scenario based on the coordinate system transformation data; and synchronize the content in the virtual scenario based on the pose transformation data of the anchor.

Based on the fifth aspect, in an embodiment, the map data further carries positioning data, and the positioning data includes at least one of GPS positioning data of the another terminal, BeiDou positioning data of the another terminal, Wi-Fi positioning data of the another terminal, Bluetooth positioning data of the another terminal, or base station positioning data of the another terminal; and the SLAM module is configured to obtain a two-dimensional feature image of the terminal based on the positioning data.

In an embodiment, the functional modules of the terminal may be configured to implement the method described in the second aspect.

According to a sixth aspect, an embodiment of the present disclosure provides a data processing server used in a virtual scenario. The server includes: a receiving module, configured to receive map data sent by a first terminal, where the map data is generated based on first point cloud data of an object, pose data of the first terminal in a first camera coordinate system of the first terminal, and a two-dimensional feature image of the first terminal, and the first point cloud data indicates three-dimensional coordinate values of a surface point of the object in the first camera coordinate system of the first terminal; where the receiving module is further configured to receive pose data of a second terminal in a second camera coordinate system of the second terminal and a two-dimensional feature image of the second terminal; a coordinate system transformation module, configured to perform a feature matching operation in the map data by using the two-dimensional feature image of the second terminal, to obtain pose data of the second terminal in the first camera coordinate system; and obtain coordinate system transformation data between the first camera coordinate system and the second camera coordinate system based on the pose data of the second terminal in the first camera coordinate system and the pose data of the second terminal in the second camera coordinate system; and a sending module, configured to send the coordinate system transformation data to the second terminal.

In an embodiment, the functional modules of the server may be configured to implement the method described in the third aspect.

According to a seventh aspect, an embodiment of the present disclosure provides another terminal. The terminal includes a processor, and a memory and a transmitter that are coupled to the processor. The processor may invoke a program instruction stored in the memory, to implement the method described in the first aspect.

According to an eighth aspect, an embodiment of the present disclosure provides still another terminal. The terminal includes a processor, and a memory and a receiver that are coupled to the processor. The processor may invoke a program instruction stored in the memory, to implement the method described in the second aspect.

According to a ninth aspect, an embodiment of the present disclosure provides another server. The server includes a processor, and a memory and a communications interface that are coupled to the processor. The processor may invoke a program instruction stored in the memory, to implement the method described in the third aspect.

According to a tenth aspect, an embodiment of the present disclosure provides a non-volatile computer readable storage medium. The computer readable storage medium is configured to store code for implementing the method in the first aspect. When the program code is executed by a computing device, the computing device is configured to perform the method in the first aspect.

According to an eleventh aspect, an embodiment of the present disclosure provides another non-volatile computer readable storage medium. The computer readable storage medium is configured to store code for implementing the method in the second aspect. When the program code is executed by a computing device, the user equipment is configured to perform the method in the second aspect.

According to a twelfth aspect, an embodiment of the present disclosure provides still another non-volatile computer readable storage medium. The computer readable storage medium is configured to store code for implementing the method in the third aspect. When the program code is executed by a computing device, the user equipment is configured to perform the method in the third aspect.

According to a thirteenth aspect, an embodiment of the present disclosure provides a computer program product. The computer program product includes a program instruction. When the computer program product is executed by a computing device, the controller performs the method in the first aspect. The computer program product may be a software installation package. When the method provided in an embodiment of the first aspect needs to be used, the computer program product may be downloaded, and the computer program product is executed on the controller, to implement the method in the first aspect.

According to a fourteenth aspect, an embodiment of the present disclosure provides another computer program product. The computer program product includes a program instruction. When the computer program product is executed by user equipment, the controller performs the method provided in an embodiment of the second aspect. The computer program product may be a software installation package. When the method provided in an embodiment of the second aspect needs to be used, the computer program product may be downloaded, and the computer program product is executed on the controller, to implement the method in the second aspect.

According to a fifteenth aspect, an embodiment of the present disclosure provides still another computer program product. The computer program product includes a program instruction. When the computer program product is executed by user equipment, the controller performs the method provided in an embodiment of the third aspect. The computer program product may be a software installation package. When the method provided in an embodiment of the third aspect needs to be used, the computer program product may be downloaded, and the computer program product is executed on the controller, to implement the method in the third aspect.

It can be learned that, in an embodiment of the present disclosure, different mobile terminals each can extract an image feature of a same type by using output data of a respective spatial positioning engine. The second terminal implements coordinate system synchronization between the two terminals based on the key frame generated by the second terminal and the map data provided by the first terminal. Alternatively, the second terminal implements coordinate system synchronization between the two terminals based on the coordinate system transformation data delivered by the server. For example, even if different spatial positioning engines are installed on different mobile terminals, content synchronization in the virtual scenario can still be implemented. This helps implement cross-platform and multi-person sharing AR/VR/MR development and application between different spatial positioning engines, and improves user experience.

It may be further learned that, in an embodiment of the present disclosure, feature extraction can be performed on an object in any scenario in an effective feature extraction manner, so as to implement coordinate system synchronization between different terminals. Therefore, a multi-person sharing AR application scenario is not limited by the environment. For example, in a process of implementing interaction in a multi-user virtual scenario, there is no need to relay on known information such as a geometrical object, and the multi-person sharing AR/VR/MR application is no longer affected by the environment, thereby meeting requirements of various application scenarios.

BRIEF DESCRIPTION OF DRAWINGS

To describe the technical solutions in the embodiments of the present disclosure or in the background more clearly, the following briefly describes the accompanying drawings required for describing the embodiments of the present disclosure or the background.

DESCRIPTION OF EMBODIMENTS

The following describes the embodiments of the present disclosure with reference to the accompanying drawings in the embodiments of the present disclosure. Terms used in the implementation part of the present disclosure are merely intended to explain specific embodiments of the present disclosure, but are not intended to limit the present disclosure.

First, two application architectures related in the embodiments of the present disclosure are described.

Figure 1:
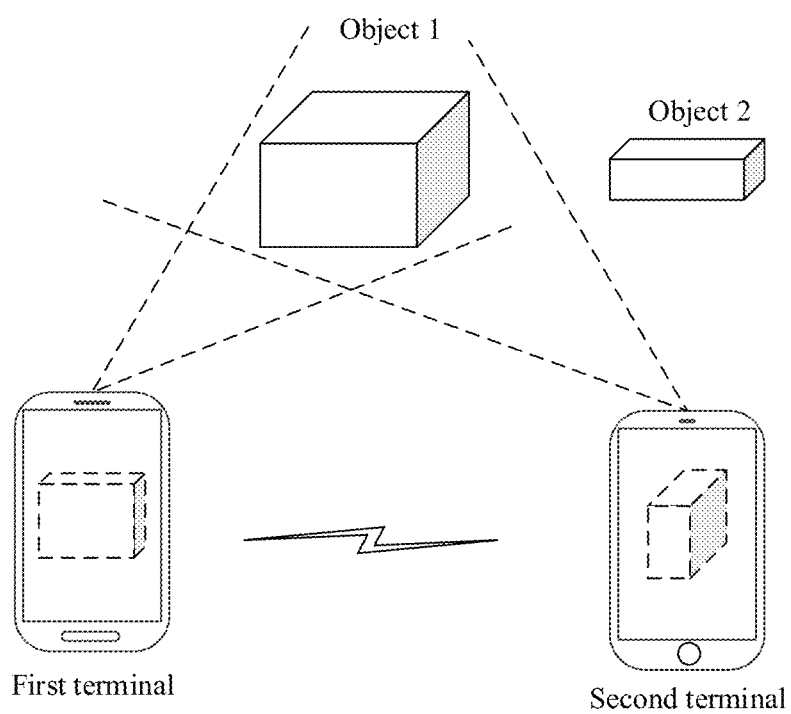
FIG. 1 is a schematic diagram of an application architecture according to an embodiment of the present disclosure.

Referring to FIG. 1, a first application architecture provided in an embodiment of the present disclosure includes a plurality of terminals. The terminal may be a mobile terminal device such as a mobile phone, a tablet computer, a notebook computer, or a video recorder, or may be a terminal device (such as VR glasses or an MR interactive device) in a virtual scenario. Terminals in the plurality of terminals may be terminals of a same type (for example, mobile phones of a same model) or may be terminals of different types (for example, the plurality of terminals include mobile phones of different models, or the plurality of terminals include a mobile terminal device and a terminal device that is in a virtual scenario). For example, FIG. 1 shows an example of a first terminal and a second terminal, and the first terminal and the second terminal are mobile phones of different models.

The first terminal and the second terminal may run in a same environment in a real world, and the environment may be any natural environment. The first terminal and the second terminal separately run a virtual scenario application (a VR application, an AR application, or an MR application), and the first terminal and the second terminal may be communicatively connected. The first terminal may collect information of any object in the environment by using a camera and/or a sensor (for example, the first terminal may collect an image of an object 1 in the environment in the figure, and the object 1 may be a complete object, or may be a partial feature of an object), and then send data (for example, send map data described below) to the second terminal. The second terminal may implement, based on the data sent by the first terminal, synchronization between virtual scenario content running by the second terminal and virtual scenario content running by the first terminal.

Figure 2:
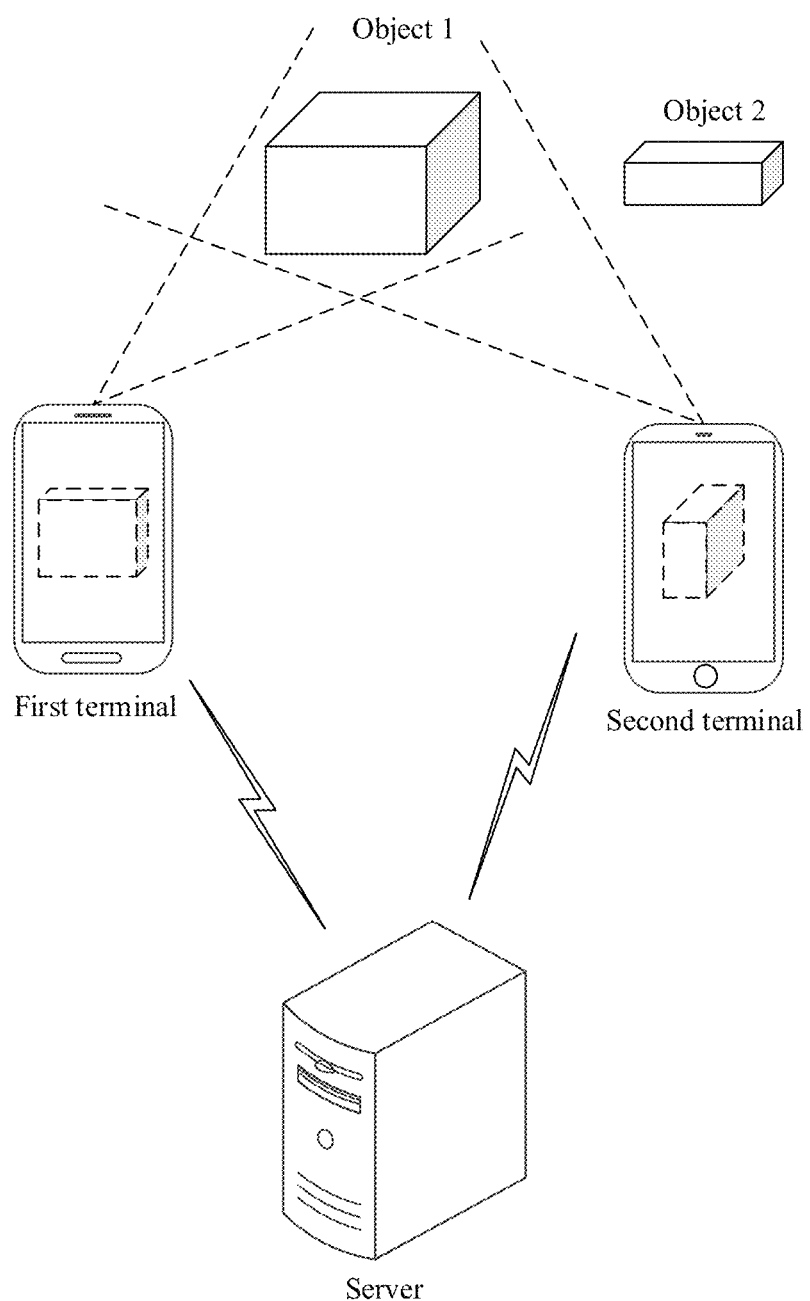
FIG. 2 is a schematic diagram of another application architecture according to an embodiment of the present disclosure.

Referring to FIG. 2, a second application architecture provided in an embodiment of the present disclosure includes a plurality of terminals and a server. The terminal may be a mobile terminal device such as a mobile phone, a tablet computer, a notebook computer, or a video recorder, or may be a terminal device (such as VR glasses or an MR interactive device) in a virtual scenario. Terminals in the plurality of terminals may be terminals of a same type (for example, mobile phones of a same model) or may be terminals of different types (for example, the plurality of terminals include mobile phones of different models, or the plurality of terminals include a mobile terminal device and a terminal device that is in a virtual scenario). For example, FIG. 2 shows an example of a first terminal and a second terminal, and the first terminal and the second terminal are mobile phones of different models. The server may be one or more physical servers (for example, FIG. 2 shows one physical server), may be a computer cluster, or may be a virtual machine in a cloud computing scenario.

The first terminal and the second terminal may run in a same environment scenario in a real world. The first terminal and the second terminal separately run a virtual scenario application (a VR application, an AR application, or an MR application), the first terminal and the server may be communicatively connected, and the second terminal and the server may also be communicatively connected. The first terminal may collect information of any object in the environment (for example, collect an image of an object 1 in the environment in the figure) by using a local camera and/or a local sensor, and then upload data to the server (for example, send map data described below). The second terminal may also collect, by using a local camera and/or a local sensor, information of an object that is in the environment and that is the same as that of the first terminal (for example, collect an image of the object 1 in the environment in the figure), and then upload data to the server (for example, send a two-dimensional feature image described below). The server performs calculation based on the foregoing data to obtain data related to content synchronization (coordinate system transformation data described below), and delivers the related data to the second terminal. The second terminal implements, based on the related data, synchronization between virtual scenario content running by the second terminal and virtual scenario content running by the first terminal.

Figure 3:
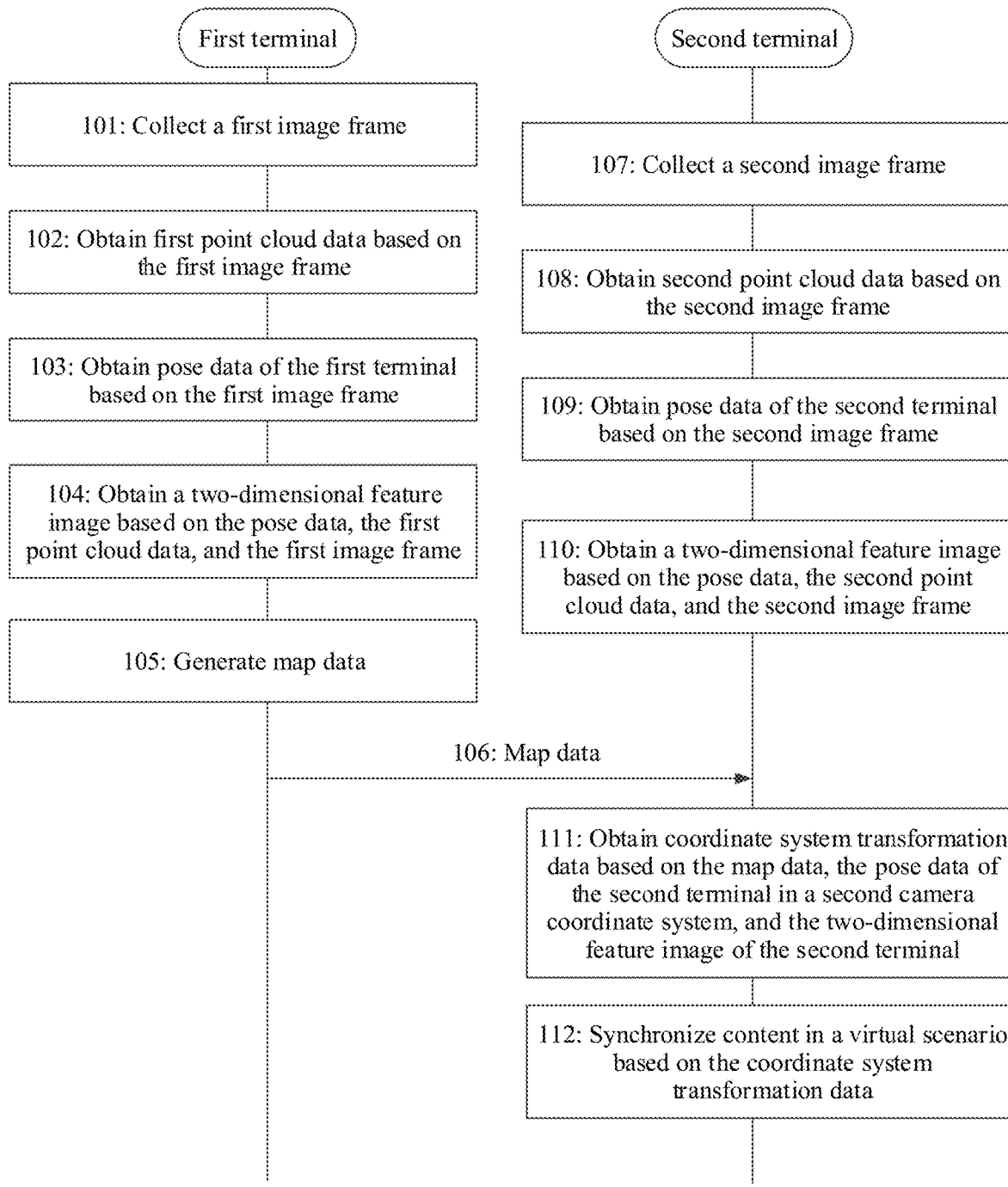
FIG. 3 is a schematic flowchart of a data processing method used in a virtual scenario according to an embodiment of the present disclosure.

Based on the foregoing first application architecture, the following describes a data processing method applied in a virtual scenario according to an embodiment of the present disclosure. The virtual scenario is one of a VR scenario, an AR scenario, and an MR scenario. FIG. 3 is a schematic flowchart of a data processing method according to an embodiment of the present disclosure. Description is provided from perspectives of a first terminal side and a second terminal side. A first terminal and a second terminal may be terminals of a same type or may be terminals of different types. The method includes but is not limited to the following operations.

Operation 101: The first terminal collects a first image by using a camera of the first terminal.

For example, the camera (or referred to as a camera lens, and for details, refer to the following description of a terminal structure) is disposed in the first terminal. Therefore, the first terminal may shoot an environment of a real world by using the camera, to obtain the first image.

Operation 102: The first terminal obtains first point cloud data of an object in the environment based on the first image.

For example, a spatial positioning engine (also referred to as an SLAM module or an SLAM system, and for details, refer to the following description of the terminal structure) is configured in the first terminal. Because the first image is obtained by shooting the environment, the first image includes an image of an object in the environment. The object may be all or some features of any object in any shape in the environment. In other words, the object does not need to be an object or have a regular shape.

The spatial positioning engine may obtain, through calculation, the first point cloud data of the object based on the first image, where the first point cloud data indicates three-dimensional coordinate values (or referred to as 3D coordinate values) of a surface point of the object in the environment in a first camera coordinate system of the first terminal. The first camera coordinate system of the first terminal is a local reference coordinate system of the first terminal, and the first camera coordinate system is a rectangular coordinate system formed by using an intersection point between an optical axis and an image plane as an origin of an image coordinate system. In an embodiment, an origin of the first camera coordinate system is an optical center of the camera of the first terminal. An x-axis and a y-axis of the first camera coordinate system are respectively parallel to two axes of the image coordinate system. A z-axis of the first camera coordinate system may be the optical axis of the camera, and is perpendicular to the image plane.

Operation 103: The first terminal obtains pose data of the first terminal in the first camera coordinate system based on the first image.

The pose data is used to indicate a location and a pose (or a direction) of the first terminal in the first camera coordinate system. The location may be represented by using three coordinate axes x, y, and z, and the direction may be represented by using ($\alpha$, $\beta$, $\gamma$). ($\alpha$, $\beta$, $\gamma$) respectively represents an angle of rotation around the three coordinate axes.

In an embodiment, the spatial positioning engine of the first terminal may obtain, through calculation, the pose data of the first terminal in the first camera coordinate system based on data (the first image) collected by the camera.

In an embodiment, an inertial measurement unit (Inertial measurement unit, IMU) sensor is further disposed in the first terminal. In this case, an input signal of the spatial positioning engine includes image data collected by the camera and data (which may be referred to as motion data) collected by the IMU sensor. The spatial positioning engine may obtain, through calculation, the pose data of the first terminal in the first camera coordinate system based on the image data and the motion data.

In an embodiment, in addition to the camera and the IMU, a positioning module (GPS positioning, BeiDou positioning, Wi-Fi positioning, base station positioning, or the like, and for details, refer to the following description of the terminal structure) related to a pose or motion is further disposed in the first terminal. In this case, the spatial positioning engine may further obtain, through calculation, the pose data of the first terminal in the first camera coordinate system with reference to data collected by the positioning module.

Operation 104: The first terminal obtains a two-dimensional feature image based on the pose data, the first point cloud data, and the first image that are corresponding to a same timestamp.

For example, the first terminal projects the first point cloud data onto the first image based on the pose data, to obtain two-dimensional image coordinates (also referred to as as 2D image coordinates) that are corresponding to the first point cloud data and that are in an image coordinate system of the first image; and then extracts the two-dimensional feature image (also referred to as a 2D feature image) based on an image block or an image feature point descriptor, where the image block or the image feature point descriptor is corresponding to the two-dimensional image coordinates and is in the first image.

Figure 4:
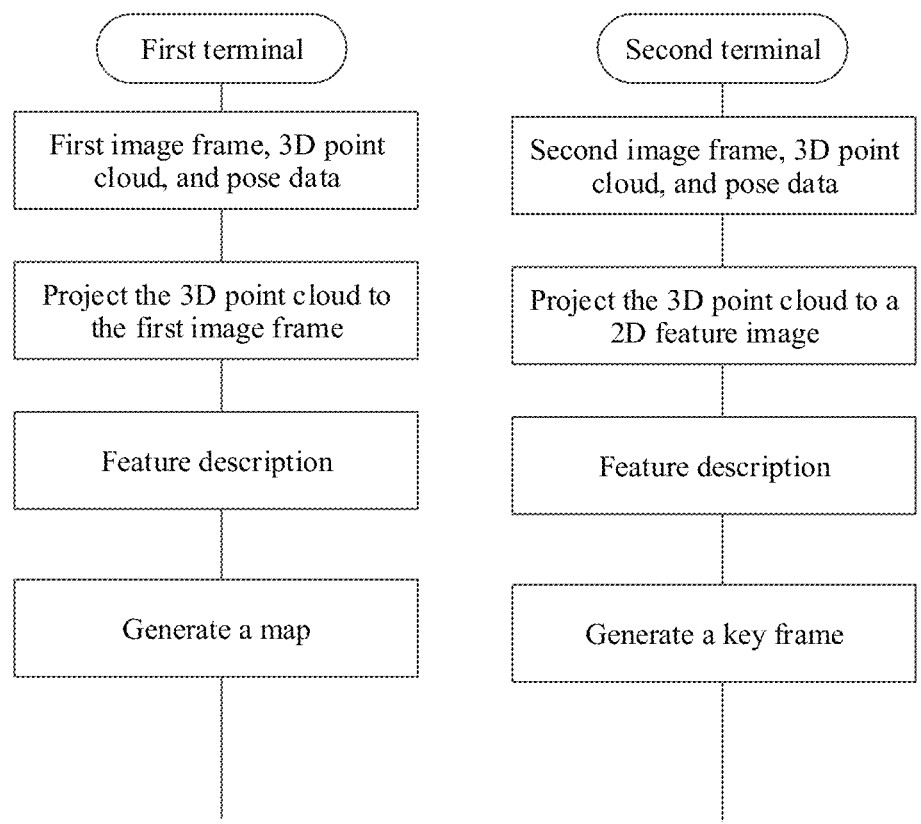
FIG. 4 is a schematic diagram of respectively generating a map and a key frame by a first terminal and a second terminal according to an embodiment of the present disclosure.

In an embodiment, in the first terminal shown in FIG. 4, the first terminal may select, at a preset time interval, one frame of image (the first image), and pose data and first point cloud data that have a same timestamp and that are output by the spatial positioning engine, project the first point cloud data onto the first image by using the pose data, to obtain the 2D image coordinates, and then provide a 2D feature description of the 2D image coordinates. The feature description may be an image feature point descriptor description or an image block description. The image feature point descriptor includes but is not limited to one of Brief, Brisk, ORB, Freak, SIFT, and SURF. In this way, 2D feature images that are corresponding to the image and that have a same timestamp may be obtained. In an embodiment, a set of the 2D feature image, the first point cloud data, and the pose data that are associated with a same timestamp of the first terminal may be set as a key frame of the first terminal.

Operation 105: The first terminal generates map data based on the first point cloud data, the pose data, and the two-dimensional feature image.

For example, the first terminal generates the map data based on the first point cloud data and the pose data that are output by the spatial positioning engine and the 2D feature image that is extracted in operation 104 and that is associated with the first point cloud data, and packetizes the generated map data into a data packet for subsequent sending.

In an embodiment, if the set of the 2D feature image, the first point cloud data, and the pose data that are associated with the same timestamp may be set as the key frame of the first terminal, if the first terminal repeats operation 101 to operation 104 described above at a preset time interval, in operation 105, the finally packetized map data may be a set of one or more key frames of a local area in which the first terminal is located.

In addition, in an embodiment, if a positioning module (for example, GPS positioning, BeiDou positioning, Wi-Fi positioning, or base station positioning, and for details, refer to the following description of the terminal structure) is disposed in the first terminal, the first terminal may further obtain, by using the positioning module, positioning data of the first terminal when the map data is generated. The positioning data includes at least one of GPS positioning data, BeiDou positioning data, Wi-Fi positioning data, Bluetooth positioning data, or base station positioning data. Then, the positioning data and the map data are packetized into a data packet (or the map data carries the positioning data) for subsequent sending.

Operation 106: The first terminal sends the map data to the second terminal, and correspondingly, the second terminal receives the map data.

Operation 107: The second terminal collects a second image by using a camera of the second terminal.

For example, the camera (or referred to as a camera lens, and for details, refer to the following description of the terminal structure) is also disposed in the second terminal. Therefore, the second terminal may shoot an environment of a real world by using the camera, to obtain the second image.

Operation 108: The second terminal obtains second point cloud data of the object in the environment based on the second image. The second point cloud data indicates three-dimensional coordinate values of a surface point of the object in a second camera coordinate system of the second terminal.

For example, a spatial positioning engine (also referred to as an SLAM module or an SLAM system, and for details, refer to the following description of the terminal structure) is also disposed in the second terminal. The spatial positioning engine of the second terminal may be different from the spatial positioning engine of the first terminal or may be the same as the spatial positioning engine of the first terminal. Because the second image is obtained by shooting the environment, the second image includes an image of the object in the environment, and the object is the object used by the first terminal in operation 102.

Similarly, the spatial positioning engine may obtain, through calculation, the second point cloud data of the object based on the second image, where the second point cloud data indicates the three-dimensional coordinate values (or referred to as 3D coordinate values) of the surface point of the object in the environment in the second camera coordinate system of the second terminal. The second camera coordinate system of the second terminal is a local reference coordinate system of the second terminal, and the second camera coordinate system is a rectangular coordinate system formed by using an intersection point between an optical axis and an image plane as an origin of an image coordinate system. In an embodiment, an origin of the second camera coordinate system is an optical center of the camera of the second terminal. An x-axis and a y-axis of the second camera coordinate system are respectively parallel to two axes of the image coordinate system. A z-axis of the second camera coordinate system may be the optical axis of the camera, and is perpendicular to the image plane.

Operation 109: The second terminal obtains pose data of the second terminal in the second camera coordinate system based on the second image.

Similarly, the pose data is used to indicate a location and a pose (or a direction) of the second terminal in the second camera coordinate system. The location may be represented by using three coordinate axes x, y, and z, and the direction may be represented by using ($\alpha$, $\beta$, $\gamma$). ($\alpha$, $\beta$, $\gamma$) respectively represents an angle of rotation around the three coordinate axes.

In an embodiment, the spatial positioning engine of the second terminal may obtain, through calculation, the pose data of the second terminal in the second camera coordinate system based on data (the second image) collected by the camera.

In an embodiment, an IMU sensor is further disposed in the second terminal. In this case, an input signal of the spatial positioning engine includes image data collected by the camera and data (which may be referred to as motion data) collected by the IMU sensor. The spatial positioning engine may obtain, through calculation, the pose data of the second terminal in the second camera coordinate system based on the image data and the motion data.

In an embodiment, in addition to the camera and the IMU, a positioning module (GPS positioning, BeiDou positioning, Wi-Fi positioning, base station positioning, or the like, and for details, refer to the following description of the terminal structure) related to a pose or motion is further disposed in the second terminal. In this case, the spatial positioning engine may further obtain, through calculation, the pose data of the second terminal in the second camera coordinate system with reference to data collected by the positioning module.

Operation 110: The second terminal obtains a two-dimensional feature image based on the pose data, the second point cloud data, and the second image.

Similarly, the second terminal projects the second point cloud data onto the second image based on the pose data of the second terminal in the second camera coordinate system, to obtain two-dimensional image coordinates (also referred to as 2D image coordinates) that are corresponding to the second point cloud data and that are in an image coordinate system of the second image; and then obtains the two-dimensional feature image (also referred to as a 2D feature image) of the second terminal based on an image block or an image feature point descriptor, where the image block or the image feature point descriptor is corresponding to the two-dimensional image coordinates and is in the second image.

In an embodiment, in the second terminal shown in FIG. 4, the second terminal may select, at a preset time interval, one frame of image (the second image), and pose data and second point cloud data that have a same timestamp and that are output by the spatial positioning engine, project the second point cloud data onto the second image by using the pose data, to obtain the 2D image coordinates, and then provide a 2D feature description of the 2D image coordinates. The feature description may be an image feature point descriptor description or an image block description. The image feature point descriptor includes but is not limited to one of Brief, Brisk, ORB, Freak, SIFT, and SURF. In this way, 2D feature images that are corresponding to the image and that have a same timestamp may be obtained. In an embodiment, a set of the 2D feature image of the second terminal, the second point cloud data, and the pose data of the second terminal that are associated with a same timestamp of the second terminal may be set as a key frame of the second terminal.

It should be noted that there is no necessary sequence between operation 107 to operation 110 and operation 106. That is, operation 106 may be performed before operation 107, operation 106 may be performed after operation 107 and before operation 110, or operation 106 may be performed after operation 110. This is not specifically limited in the present disclosure.

Operation 111: The second terminal obtains coordinate system transformation data between the first camera coordinate system and the second camera coordinate system based on the map data, the pose data of the second terminal in the second camera coordinate system, and the two-dimensional feature image of the second terminal.

For example, the second terminal may perform, by using the key frame of the second terminal, feature matching in the map data sent by the first terminal, to obtain pose data of the second terminal in the first camera coordinate system (herein also referred to as a map coordinate system) of the first terminal; and then the second terminal obtains the coordinate system transformation data between the first camera coordinate system and the second camera coordinate system based on the pose data of the second terminal in the first camera coordinate system and the pose data of the second terminal in the second camera coordinate system.

Figure 5:
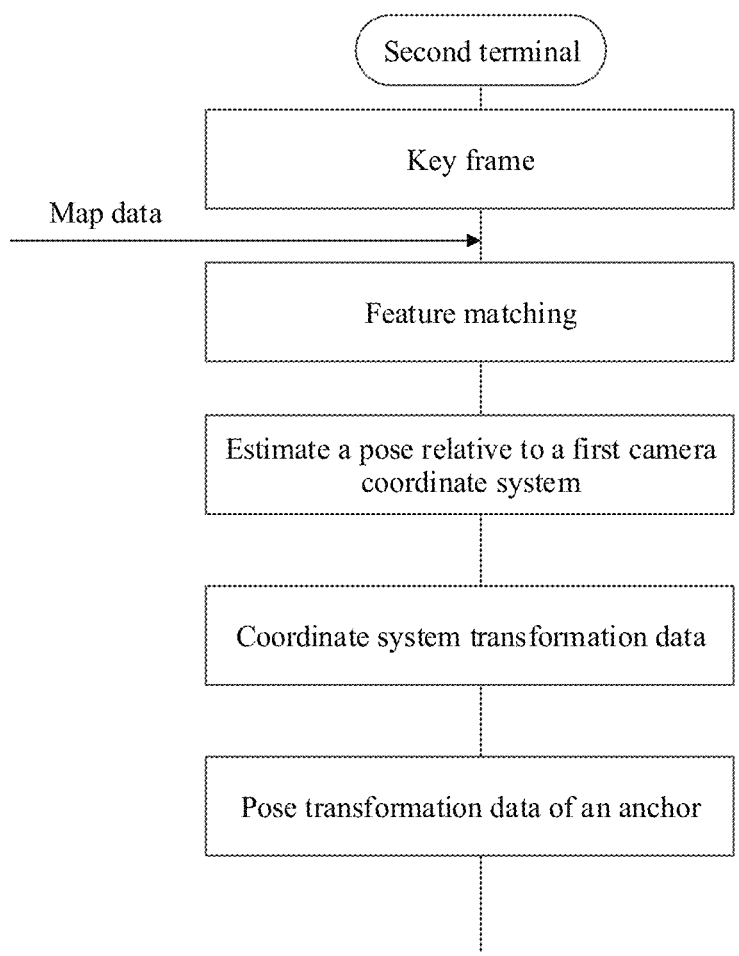
FIG. 5 is a schematic diagram of obtaining coordinate system transformation data and pose transformation data of an anchor by a second terminal according to an embodiment of the present disclosure.

In an embodiment, as shown in FIG. 5, the second terminal may perform feature matching based on the key frame determined by the second terminal and the received map data, extract a same image feature of the determined key frame and the received map data, and output a feature point matching set, to estimate the pose data of the second terminal relative to the first camera coordinate system. A pose estimation algorithm may be a PNP algorithm. Then, the second terminal obtains the coordinate system transformation data (for example, a coordinate system transformation matrix) between the first camera coordinate system and the second camera coordinate system based on the pose data of the second terminal in the first camera coordinate system and the pose data of the second terminal in the second camera coordinate system. In an embodiment, pose transformation data of an anchor in the virtual scenario may be further calculated subsequently based on the coordinate system transformation matrix.

It should be noted that, in an embodiment, if a data packet or the map data sent by the first terminal to the second terminal carries the positioning data of the first terminal, in a feature matching process, the second terminal may first determine a search scope of the two-dimensional feature image based on the positioning data, to screen a plurality of key frames generated for a plurality of times in operation 110 based on the search scope, for example, to select a key frame that is closer to or closest to the positioning data; and then perform feature matching in the map data by using the key frame, to obtain the pose data of the second terminal in the first camera coordinate system of the first terminal. This helps improve matching efficiency and accuracy.

Operation 112: The second terminal synchronizes content (for example, a virtual object) in the virtual scenario based on the coordinate system transformation data.

For example, after obtaining the pose transformation data of the anchor in the virtual scenario based on the coordinate system transformation data, the second terminal may synchronize a pose of a virtual object in the virtual scenario based on the pose transformation data of the anchor. In other words, the second terminal can correctly display, through synchronization, a pose of a virtual object shared by the first terminal.

It can be learned that, in an embodiment of the present disclosure, different mobile terminals each can extract an image feature of a same type by using output data of a respective spatial positioning engine. The second terminal implements coordinate system synchronization between the two terminals based on the key frame generated by the second terminal and the map data provided by the first terminal. For example, even if different spatial positioning engines are installed on different mobile terminals, content synchronization in the virtual scenario can still be implemented. This helps implement cross-platform and multi-person sharing AR/VR/MR development and application between different spatial positioning engines, and improves user experience.

It may be further learned that, in an embodiment of the present disclosure, feature extraction can be performed on an object in any scenario in an effective feature extraction manner, so as to implement coordinate system synchronization between different terminals. Therefore, a multi-person sharing AR application scenario is not limited by the environment. For example, in a process of implementing interaction in a multi-user virtual scenario, there is no need to relay on known information such as a Marker image and a geometrical object, and the multi-person sharing AR/VR/MR application is no longer affected by the environment, thereby meeting requirements of various application scenarios.

Figure 6:
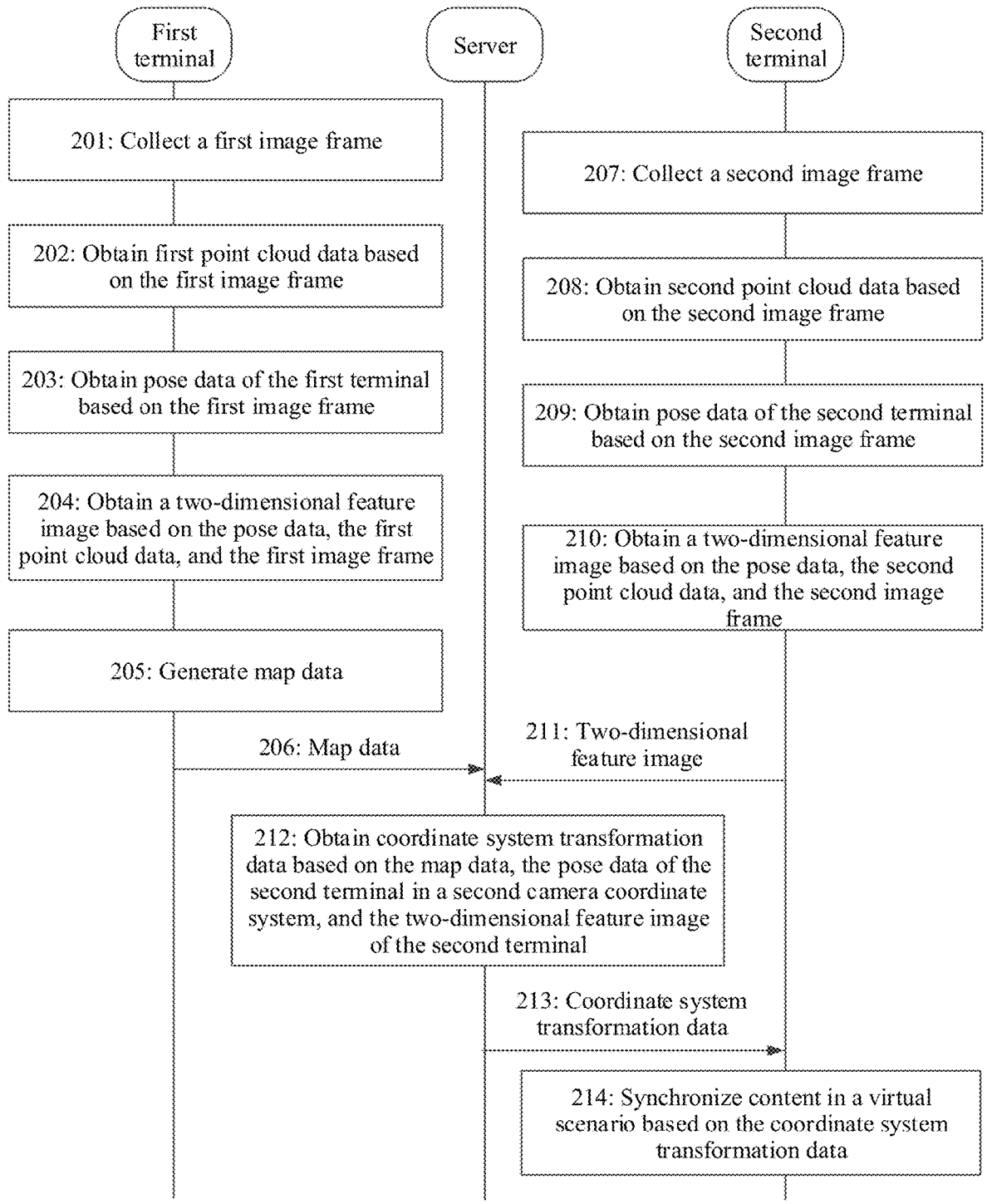
FIG. 6 is a schematic flowchart of another data processing method used in a virtual scenario according to an embodiment of the present disclosure.

Based on the foregoing second application architecture, the following describes another data processing method applied in a virtual scenario according to an embodiment of the present disclosure. The virtual scenario is one of a VR scenario, an AR scenario, and an MR scenario. FIG. 6 is a schematic flowchart of another data processing method according to an embodiment of the present disclosure. Description is provided from perspectives of a first terminal side, a server side, and a second terminal side. A first terminal and a second terminal may be terminals of a same type or may be terminals of different types. The method includes but is not limited to the following operations.

Operation 201: The first terminal collects a first image by using a camera of the first terminal. In an embodiment, refer to the description of operation 101 in the embodiment in FIG. 3. Details are not described herein again.

Operation 202: The first terminal obtains first point cloud data of an object in an environment based on the first image. In an embodiment, refer to the description of operation 102 in the embodiment in FIG. 3. Details are not described herein again.

Operation 203: The first terminal obtains pose data of the first terminal in the first camera coordinate system based on the first image. In an embodiment, refer to the description of operation 103 in the embodiment in FIG. 3. Details are not described herein again.

Operation 204: The first terminal obtains a two-dimensional feature image based on the pose data, the first point cloud data, and the first image. In an embodiment, refer to the description of operation 104 in the embodiment in FIG. 3. Details are not described herein again.

Operation 205: The first terminal generates map data based on the first point cloud data, the pose data, and the two-dimensional feature image. In an embodiment, refer to the description of operation 105 in the embodiment in FIG. 3. Details are not described herein again.

Operation 206: The first terminal sends the map data to the server, and correspondingly, the server receives the map data.

Operation 207: The second terminal collects a second image by using a camera of the second terminal. In an embodiment, refer to the description of operation 107 in the embodiment in FIG. 3. Details are not described herein again.

Operation 208: The second terminal obtains second point cloud data of the object in the environment based on the second image. In an embodiment, refer to the description of operation 108 in the embodiment in FIG. 3. Details are not described herein again.

Operation 209: The second terminal obtains pose data of the second terminal in the second camera coordinate system based on the second image. In an embodiment, refer to the description of operation 109 in the embodiment in FIG. 3. Details are not described herein again.

Operation 210: The second terminal obtains a two-dimensional feature image based on the pose data, the second point cloud data, and the second image. In an embodiment, refer to the description of operation 110 in the embodiment in FIG. 3. Details are not described herein again.

Operation 211: The second terminal sends the pose data of the second terminal and the two-dimensional feature image to the server.

In an embodiment, the second terminal may set a set of a 2D feature image of the second terminal, the second point cloud data, and the pose data of the second terminal in the second camera coordinate system that are associated with a same timestamp as a key frame of the second terminal. In this case, the second terminal may alternatively send the key frame to the server directly.

Operation 212: The server obtains coordinate system transformation data based on the map data, the pose data of the second terminal in the second camera coordinate system, and the two-dimensional feature image of the second terminal.

In an embodiment, the server may perform, by using the key frame of the second terminal, feature matching in the map data sent by the first terminal, to obtain pose data of the second terminal in the first camera coordinate system (herein also referred to as a map coordinate system) of the first terminal; and then the server obtains the coordinate system transformation data between the first camera coordinate system and the second camera coordinate system based on the pose data of the second terminal in the first camera coordinate system and the pose data of the second terminal in the second camera coordinate system.

In addition, in an embodiment, the server may subsequently further obtain, through calculation based on the coordinate system transformation data, pose transformation data of an anchor in the virtual scenario.

It should be noted that, for a process of operation 212, refer to the description of operation 111 in the embodiment in FIG. 3. Details are not described herein again.

Operation 213: The server sends the coordinate system transformation data to the second terminal. It should be noted that, in operation 212, if the server has obtained, through calculation based on the coordinate system transformation data, the pose transformation data of the anchor in the virtual scenario, the server may also send the pose transformation data of the anchor to the second terminal.

Operation 214: The second terminal synchronizes content in the virtual scenario based on the coordinate system transformation data. For a process, refer to the description of operation 112 in the embodiment in FIG. 3. Details are not described herein again.

It can be learned that, in an embodiment, different mobile terminals each can extract an image feature of a same type by using output data of a respective spatial positioning engine. The first terminal may further generate the map data and upload the map data to the server, and the second terminal may further generate the key frame and upload the key frame to the server. The server further obtains coordinate system synchronization data based on the key frame and the map data, and delivers the coordinate system synchronization data to the second terminal, to implement coordinate system synchronization between the terminals. For example, even if different spatial positioning engines are installed on different mobile terminals, content synchronization in the virtual scenario can still be implemented. This helps implement cross-platform and multi-person sharing AR/VR/MR development and application between different spatial positioning engines, and improves user experience. In addition, because the server is used as a data exchange node between different terminals, a requirement of content synchronization among a large quantity of terminals can be efficiently met.

It may be further learned that, in an embodiment of the present disclosure, feature extraction can be performed on an object in any scenario in an effective feature extraction manner, so as to implement coordinate system synchronization between different terminals. Therefore, a multi-person sharing AR application scenario is not limited by the environment. For example, in a process of implementing interaction in a multi-user virtual scenario, there is no need to relay on known information such as a Marker image and a geometrical object, and the multi-person sharing AR/VR/MR application is no longer affected by the environment, thereby meeting requirements of various application scenarios.

The foregoing describes in detail the related methods provided in the embodiments of the present disclosure. Based on a same inventive concept, the following further describes related devices in the embodiments of the present disclosure.

Figure 7:
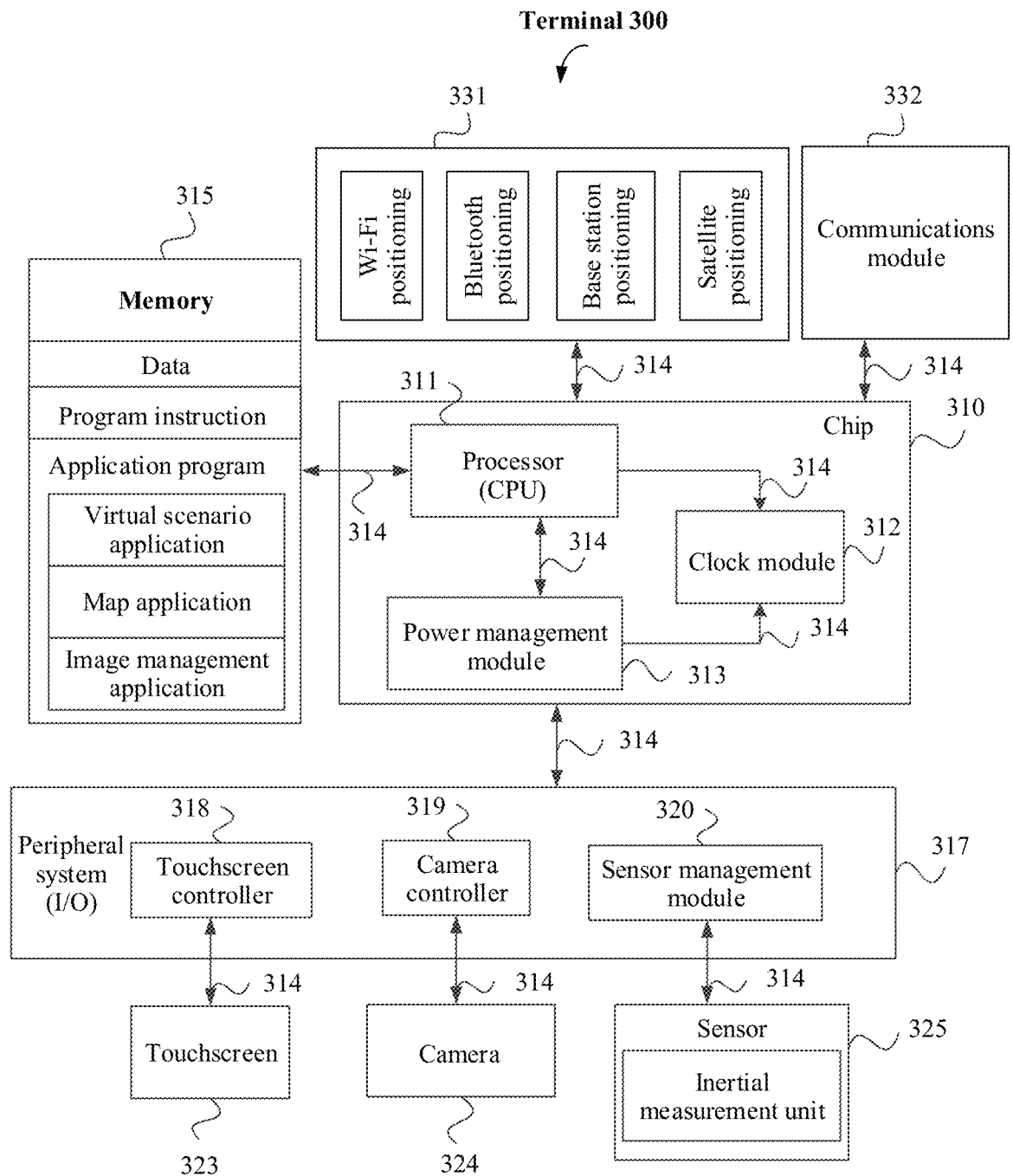
FIG. 7 is a schematic structural diagram of a terminal according to an embodiment of the present disclosure.

FIG. 7 is a structural block diagram of an embodiment of a terminal according to an embodiment of the present disclosure. As shown in FIG. 7, a terminal 300 may include a chip 310, a memory 315 (one or more computer readable storage media), a peripheral system 317, a positioning module 331, and a communications module 332. These components may perform communication by using one or more communications buses 314.

The peripheral system 317 is mainly configured to implement a function of interaction between the terminal 300 and a user/an external environment. In an embodiment, the peripheral system 317 may include several components of a touchscreen controller 318, a camera controller 319, and a sensor management module 320. Each controller may be coupled to a corresponding peripheral device such as a touchscreen 323, a camera 324, or a sensor 325. In some embodiments, the touchscreen 323 may be obtained by coupling a touch-sensitive element and a display screen. The touch-sensitive element may be disposed below the display screen. The touch-sensitive element may be configured to detect touch pressure (for example, a touch operation or a sliding operation of a user) that is applied on the display screen when the user inputs the touch operation on the display screen. The display screen is configured to display content (for example, display a virtual object applied in a virtual scenario). In some embodiments, the camera 324 may be a monocular camera, a binocular camera, or a depth camera. In some embodiments, the sensor 325 may include an inertial measurement unit IMU, and may further include another sensor (for example, a proximity sensor). It should be noted that the peripheral system 317 may further include another I/O peripheral.

The chip 310 may be integrated with one or more processors 311, a clock module 312, and a possible power management module 313. The clock module 312 integrated into the chip 310 is mainly configured to generate a clock required for data transmission and time sequence control by the processor 311. The power management module 313 integrated into the baseband chip 310 is mainly configured to provide a stable and high-precision voltage for the processor 311 and the peripheral system.

The memory 315 is coupled to the processor 311, and is configured to store data (for example, image data, point cloud data, map data, key frame data, and coordinate system transformation data), various software programs, and/or a plurality of sets of program instructions. In an embodiment, the memory 315 may include a high-speed random access memory, or may include a nonvolatile memory, for example, one or more magnetic disk storage devices, a flash memory, or another nonvolatile solid-state storage device. The memory 315 may further store one or more application programs. As shown in the figure, the application programs may include: virtual scenario application programs such as AR, VR, and MR, a map application program, and an image management application program. The memory 315 may be further configured to store an operating system, for example, an embedded operating system such as ANDROID, iOS, WINDOWS, or LINUX. The memory 115 may further store a network communications program. The network communications program may be used to communicate with one or more additional devices, one or more terminal devices, or one or more network devices. The memory 115 may further store a user interface program. The user interface program may vividly display content of an application program (such as a virtual object in a virtual scenario) by using a graphical operation interface, and receive a control operation performed by a user on the application program by using an input control, such as a menu, a dialog box, or a key.

The positioning module 331 is configured to implement physical positioning for the terminal 300, and may collect motion data of the terminal 300 by using the positioning module 331. The positioning module 331 may include, for example, one or more of a Wi-Fi positioning module, a Bluetooth positioning module, a base station positioning module, and a satellite positioning module (for example, a GPS positioning module and/or a BeiDou positioning module).

The communications module 332 is integrated with a transmitter and a receiver, and is configured to receive and send a radio frequency signal, so that the terminal 300 establishes a communication connection to another terminal, or the terminal 300 establishes a communication connection to a server. The communications module 332 is mainly integrated with a receiver and a transmitter of the terminal 300. In an embodiment, the communications module 332 may include but is not limited to an antenna system, an RF transceiver, one or more amplifiers, a tuner, one or more oscillators, a digital signal processor, a CODEC chip, a SIM card, a storage medium, and the like. In some embodiments, the communications module 332 may be alternatively implemented on a separate chip.

It should be understood that the terminal 300 is merely an example provided in an embodiment of the present disclosure. In addition, the terminal 300 may have more or fewer components than shown components, or may combine two or more components, or may have different component configurations.

In an embodiment of the present disclosure, the terminal 300 may be the first terminal and/or the second terminal in the embodiment in FIG. 3 or FIG. 6. In an embodiment, the camera 324 may be configured to collect an image of an object in an environment, and the processor 311 may be configured to invoke the program instruction in the memory 315, to implement a function of the first terminal or the second terminal in the data processing method described in the embodiment in FIG. 3 or FIG. 6 in the embodiments of the present disclosure. Therefore, for function implementation of each component of the terminal 300, refer to the foregoing description. Details are not described herein again.

Figure 8:
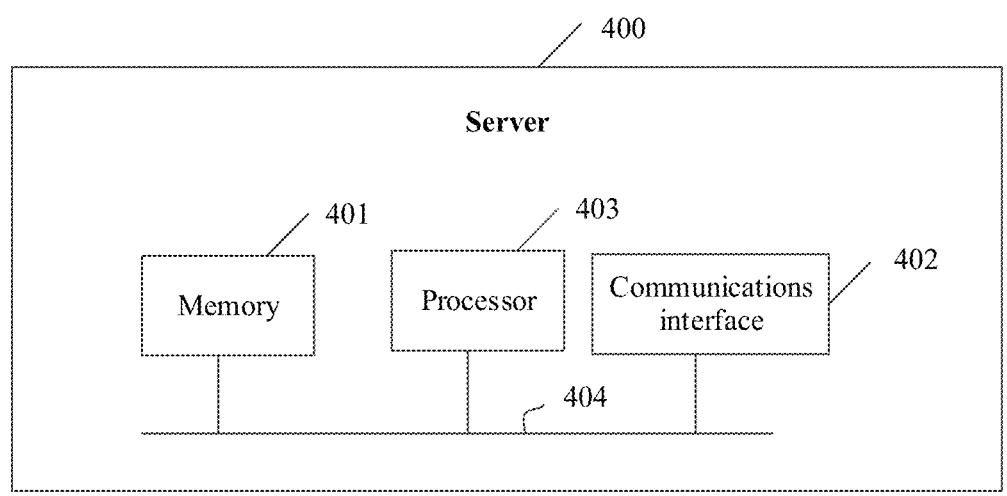
FIG. 8 is a schematic structural diagram of a server according to an embodiment of the present disclosure.

FIG. 8 is a structural block diagram of an embodiment of a server according to an embodiment of the present disclosure. As shown in FIG. 8, a server 400 includes a processor 403, a memory 401 (one or more computer readable storage media), and a communications interface 402. These components may perform communication by using one or more communications buses 404.

The processor 403 may be one or more central processing units (Central Processing Unit, CPU). When the processor 403 is one CPU, the CPU may be a single-core CPU or may be a multi-core CPU.

The memory 401 is coupled to the processor 403, and is configured to store various software programs and/or a plurality of sets of instructions and data (for example, map data, key frame data, and coordinate system transformation data). In an embodiment, the memory 401 includes but is not limited to a random access memory (RAM), a read-only memory (ROM), an erasable programmable read-only memory (EPROM), or a portable read-only memory (CD- ROM). In an embodiment, the memory 401 may be further configured to store an algorithm program used to calculate the coordinate system transformation data.

The communications interface 402 is mainly integrated with a receiver and a transmitter. The receiver is configured to receive data sent by a terminal, and the transmitter is configured to send data to the terminal. In an embodiment, the transmitter may be configured to deliver pose transformation data of an anchor or the coordinate system transformation data to the terminal, and the receiver may be configured to receive map data or key frame data uploaded by the terminal.

It should be understood that the server 400 is merely an example provided in an embodiment. In an embodiment, the server 400 may have more components than those shown in the figure.

In an embodiment of the present disclosure, the server 400 may be the server in the embodiment in FIG. 6. In an embodiment, the processor 403 may be configured to invoke a program instruction in the memory 401, to implement a function of the server in the data processing method described in the embodiment in FIG. 6 in the embodiments of the present disclosure. Therefore, for function implementation of each component of the server 400, refer to the foregoing description. Details are not described herein again.

Figure 9:
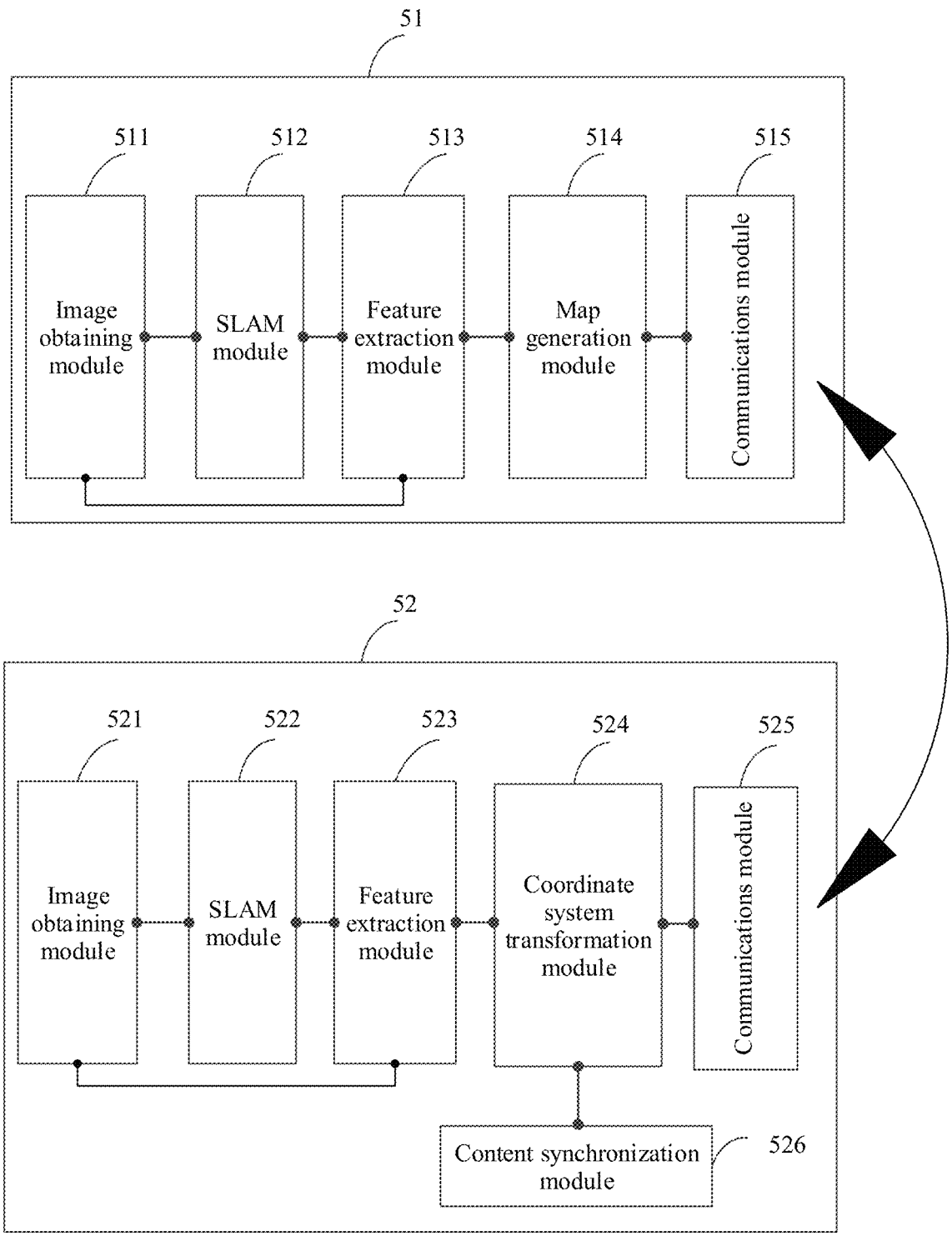
FIG. 9 is a schematic structural diagram of a system, a first terminal, and a second terminal according to an embodiment of the present disclosure.

FIG. 9 is a structural block diagram of a multi-user interaction system according to an embodiment of the present disclosure. The system includes a terminal 51 and a terminal 52. The terminal 51 and the terminal 52 may implement a communication connection by using their respective communications modules.

The terminal 51 includes an image obtaining module 511, an SLAM module 512, a feature extraction module 513, a map generation module 514, and a communications module 515. In an embodiment, data/programs of these functional modules may be stored in the foregoing memory 315. In addition, these functional modules may be run by the foregoing processor 311.

The image obtaining module 511 is configured to obtain a first image.

The SLAM module 512 is configured to obtain first point cloud data of an object in an environment based on the first image, where the first point cloud data indicates three-dimensional coordinate values of a surface point of the object in the environment in a first camera coordinate system of the terminal 51. The SLAM module 512 is further configured to obtain pose data of the terminal 51 in the first camera coordinate system based on the first image.

The feature extraction module 513 is configured to obtain a two-dimensional feature image based on the pose data, the first point cloud data, and the first image.

The map generation module 514 is configured to generate map data based on the first point cloud data, the pose data, and the two-dimensional feature image.

The communications module 515 is configured to send the map data to the terminal 52.

The terminal 52 includes an image obtaining module 521, an SLAM module 522, a feature extraction module 523, a coordinate system transformation module 524, a communications module 525, and a content synchronization module 526. In an embodiment, data/programs of these functional modules may be stored in the foregoing memory 315. In addition, these functional modules may be run by the foregoing processor 311.

The communications module 525 is configured to receive the map data sent by the terminal 51, where the map data is generated based on the first point cloud data of the object in the environment, the pose data of the terminal 51 in the first camera coordinate system of the terminal 51, and the two-dimensional feature image of the terminal 51, and the first point cloud data indicates the three-dimensional coordinate values of the surface point of the object in the first camera coordinate system of the terminal 51.

The image obtaining module 521 is configured to obtain a second image.

The SLAM module 522 is configured to obtain pose data of the terminal 52 in a second camera coordinate system of the terminal 52.

The feature extraction module 523 is configured to obtain a two-dimensional feature image of the terminal 52.

The coordinate system transformation module 524 is configured to obtain coordinate system transformation data between the first camera coordinate system and the second camera coordinate system based on the map data, the pose data of the terminal 52 in the second camera coordinate system, and the two-dimensional feature image of the terminal 52.

The content synchronization module 526 is configured to synchronize content in a virtual scenario based on the coordinate system transformation data.

It should be noted that, in an embodiment of the present disclosure, the terminal 51 may be the first terminal in the embodiment in FIG. 3 or FIG. 6, and the terminal 52 may be the second terminal in the embodiment in FIG. 3 or FIG. 6. In other words, in an embodiment, the related modules in the terminal 51 and the related modules in the terminal 52 may be respectively configured to implement related function operations of the first terminal and related function operations of the second terminal in the data processing method described in the embodiment in FIG. 3 or FIG. 6 in the embodiments of the present disclosure. Details are not described herein again.

Figure 10:
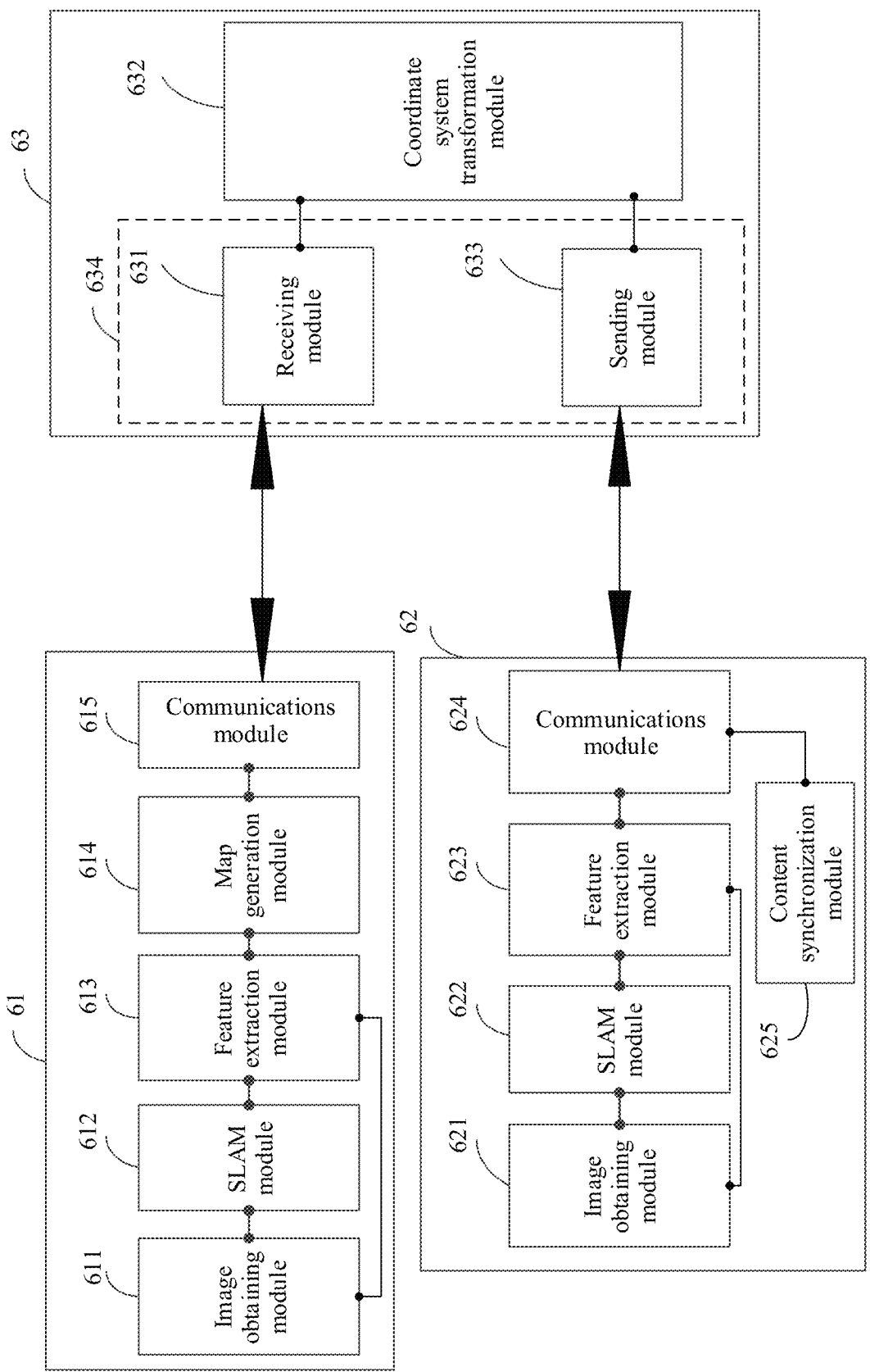
FIG. 10 is a schematic structural diagram of another system, a first terminal, a second terminal, and a server according to an embodiment of the present disclosure.

FIG. 10 is a structural block diagram of another multi-user interaction system according to an embodiment of the present disclosure. The system includes a terminal 61, a terminal 62, and a server 63. The terminal 61 and the server 63 may be communicatively connected, and the terminal 62 and the server 63 may be communicatively connected.

The terminal 61 includes an image obtaining module 611, an SLAM module 612, a feature extraction module 613, a map generation module 614, and a communications module 615. In an embodiment, data/programs of these functional modules may be stored in the foregoing memory 315. In addition, these functional modules may be run by the foregoing processor 311.

The image obtaining module 611 is configured to obtain a first image.

The SLAM module 612 is configured to obtain first point cloud data of an object in an environment based on the first image, where the first point cloud data indicates three-dimensional coordinate values of a surface point of the object in the environment in a first camera coordinate system of the terminal 61. The SLAM module 612 is further configured to obtain pose data of the terminal 61 in the first camera coordinate system based on the first image.

The feature extraction module 613 is configured to obtain a two-dimensional feature image based on the pose data, the first point cloud data, and the first image.

The map generation module 614 is configured to generate map data based on the first point cloud data, the pose data, and the two-dimensional feature image.

The communications module 615 is configured to send the map data to the server 63.

The terminal 62 includes an image obtaining module 621, an SLAM module 622, a feature extraction module 623, a communications module 624, and a content synchronization module 625. In an embodiment, data/programs of these functional modules may be stored in the foregoing memory 315. In addition, these functional modules may be run by the foregoing processor 311.

The image obtaining module 621 is configured to obtain a second image.

The SLAM module 622 is configured to obtain pose data of the terminal 62 in a second camera coordinate system of the terminal 62.

The feature extraction module 623 is configured to obtain a two-dimensional feature image of the terminal 62.

The communications module 624 is configured to send a key frame of the terminal 62 to the server, where the key frame of the terminal 62 includes the pose data of the terminal 62 in the second camera coordinate system of the terminal 62 and the two-dimensional feature image of the terminal 62.

The communications module 624 is further configured to receive coordinate system transformation data sent by the server 63.

The content synchronization module 625 is configured to synchronize content in a virtual scenario based on the coordinate system transformation data.

The server includes a receiving module 631, a coordinate system transformation module 632, and a sending module 633. In an embodiment, the receiving module 631 and the sending module 633 may be alternatively integrated into a communications module 634. In other words, the receiving module 631 and the sending module 633 are used as two sub-functions of the communications module 634. In an embodiment, data/programs of these functional modules may be stored in the foregoing memory 401, and these functional modules may run by the foregoing processor 403.

The receiving module 631 is configured to receive the map data sent by the terminal 61, where the map data is generated based on the first point cloud data of the object in the environment, the pose data of the terminal 61 in the first camera coordinate system of the terminal 61, and the two-dimensional feature image of the terminal 61, and the first point cloud data indicates the three-dimensional coordinate values of the surface point of the object in the first camera coordinate system of the terminal 61. The receiving module 631 is further configured to receive the pose data of the second terminal 62 in the second camera coordinate system of the terminal 62 and the two-dimensional feature image of the terminal 62.

The coordinate system transformation module 632 is configured to perform a feature matching operation in the map data by using the two-dimensional feature image of the terminal 62, to obtain pose data of the terminal 62 in the first camera coordinate system; and obtain the coordinate system transformation data between the first camera coordinate system and the second camera coordinate system based on the pose data of the terminal 62 in the first camera coordinate system and the pose data of the terminal 62 in the second camera coordinate system.

The sending module 633 is configured to send the coordinate system transformation data to the terminal 62.

It should be noted that, in an embodiment of the present disclosure, the terminal 61 may be the first terminal in the embodiment in FIG. 6, the terminal 62 may be the second terminal in the embodiment in FIG. 6, and the server 63 may be the server in the embodiment in FIG. 6. In other words, in an embodiment, the related modules in the terminal 61, the related modules in the terminal 62, and the related modules in the server 63 may be respectively configured to implement related function operations of the first terminal, the second terminal, and the server in the data processing method described in the embodiment in FIG. 6 in the embodiments of the present disclosure. Details are not described herein again.

It should be noted that, the feature extraction module, the map generation module, and the coordinate system transformation module provided in the embodiment in FIG. 9 or FIG. 10 in the present disclosure may provide a unified external interface. Through the unified external interface, development work of a multi-person sharing AR application in different application scenarios can be greatly reduced, thereby improving user experience.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instruction is loaded and executed on a computer, the procedures or functions according to the embodiments of the present disclosure are all or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

In the foregoing embodiments, the description of each embodiment has a focus. For a part that is not described in detail in an embodiment, refer to related descriptions in other embodiments.

What is claimed is:

1. A data processing method used in a virtual scenario, comprising:
   collecting, by a first terminal, a first image by using a camera, wherein the first image comprises an image of an object;
   obtaining, by the first terminal, first point cloud data of the object based on the first image, wherein the first point cloud data indicates three-dimensional coordinate values of a surface point of the object in a first camera coordinate system of the first terminal;
   obtaining, by the first terminal, pose data of the first terminal in the first camera coordinate system based on the first image;
   obtaining, by the first terminal, a two-dimensional feature image based on the pose data, the first point cloud data, and the first image;
   generating, by the first terminal, map data based on the first point cloud data, the pose data, and the two-dimensional feature image; and sending, by the first terminal, the map data to a second terminal or a server;
wherein the obtaining the two-dimensional feature image based on the pose data, the first point cloud data, and the first image comprises:
projecting, by the first terminal, the first point cloud data onto the first image based on the pose data, to obtain two-dimensional image coordinates that are corresponding to the first point cloud data and that are in an image coordinate system of the first image; and
obtaining, by the first terminal, the two-dimensional feature image based on an image block or an image feature point descriptor corresponding to the two-dimensional image coordinates and in the first image.

2. The method of claim 1, wherein the obtaining pose data of the first terminal in the first camera coordinate system based on the first image comprises:
obtaining, by the first terminal, the pose data of the first terminal in the first camera coordinate system based on the first image and motion data that is collected by an inertial measurement unit IMU.

3. The method of claim 1, wherein before the generating map data based on the first point cloud data, the pose data, and the two-dimensional feature image, the method further comprises:
obtaining, by the first terminal, positioning data comprising at least one of GPS positioning data of the first terminal, BeiDou positioning data of the first terminal, Wi-Fi positioning data of the first terminal, Bluetooth positioning data of the first terminal, or base station positioning data of the first terminal, wherein
correspondingly, the map data further carries the positioning data.

4. The method of claim 1, wherein the virtual scenario is one of a virtual reality (VR) scenario, an augmented reality (AR) scenario, and a mixed reality (MR) scenario.

5. A data processing method used in a virtual scenario, comprising:
receiving, by a second terminal, map data from a first terminal, wherein the map data is generated based on first point cloud data of an object, pose data of the first terminal in a first camera coordinate system of the first terminal, and a two-dimensional feature image of the first terminal, wherein the first point cloud data indicates three-dimensional coordinate values of a surface point of the object in the first camera coordinate system of the first terminal;
obtaining, by the second terminal, pose data of the second terminal in a second camera coordinate system of the second terminal;
obtaining, by the second terminal, a two-dimensional feature image of the second terminal;
obtaining, by the second terminal, coordinate system transformation data between the first camera coordinate system and the second camera coordinate system based on the map data, the pose data of the second terminal in the second camera coordinate system, and the two-dimensional feature image of the second terminal; and
synchronizing, by the second terminal, content in the virtual scenario based on the coordinate system transformation data.

6. The method of claim 5, wherein the obtaining coordinate system transformation data comprises:
performing, by the second terminal, a feature matching operation in the map data using the two-dimensional feature image of the second terminal, to obtain pose data of the second terminal in the first camera coordinate system; and
obtaining, by the second terminal, the coordinate system transformation data between the first camera coordinate system and the second camera coordinate system based on the pose data of the second terminal in the first camera coordinate system and the pose data of the second terminal in the second camera coordinate system.

7. The method of claim 5, wherein before the obtaining pose data of the second terminal in the second camera coordinate system of the second terminal, the method further comprises:
collecting, by the second terminal, a second image comprising an image of the object; and
obtaining, by the second terminal, second point cloud data of the object based on the second image, wherein the second point cloud data indicates three-dimensional coordinate values of a surface point of the object in the second camera coordinate system;
wherein the obtaining pose data of the second terminal in the second camera coordinate system of the second terminal comprises: obtaining the pose data of the second terminal in the second camera coordinate system based on the second image; and
wherein the obtaining the two-dimensional feature image of the second terminal comprises:
projecting the second point cloud data onto the second image based on the pose data of the second terminal in the second camera coordinate system, to obtain two-dimensional image coordinates corresponding to the second point cloud data and in an image coordinate system of the second image, and
obtaining the two-dimensional feature image of the second terminal based on an image block or an image feature point descriptor corresponding to the two-dimensional image coordinates and in the second image.

8. The method of claim 5, wherein the synchronizing content in the virtual scenario based on the coordinate system transformation data comprises:
obtaining, by the second terminal, pose transformation data of an anchor in the virtual scenario based on the coordinate system transformation data; and
synchronizing, by the second terminal, the content in the virtual scenario based on the pose transformation data of the anchor.

9. The method of claim 5, wherein the map data further carries positioning data comprising at least one of GPS positioning data of the first terminal, BeiDou positioning data of the first terminal, Wi-Fi positioning data of the first terminal, Bluetooth positioning data of the first terminal, or base station positioning data of the first terminal; and
wherein the obtaining the two-dimensional feature image of the second terminal comprises:
determining a search scope of the two-dimensional feature image based on the positioning data, and
determining the two-dimensional feature image of the second terminal from a plurality of historical two-dimensional feature images based on the search scope.

10. A data processing terminal used in a virtual scenario, comprising:
a camera, configured to collect a first image comprising an image of an object;

a spatial positioning engine, configured to obtain first point cloud data of the object based on the first image, wherein the first point cloud data indicates three-dimensional coordinate values of a surface point of the object in a first camera coordinate system of the terminal; and obtain pose data of the terminal in the first camera coordinate system based on the first image;

a feature extractor, configured to obtain a two-dimensional feature image based on the pose data, the first point cloud data, and the first image;

a map generator, configured to generate map data based on the first point cloud data, the pose data, and the two-dimensional feature image; and a communication interface, configured to send the map data to another terminal or a server;

wherein the feature extractor is further configured to:

project the first point cloud data onto the first image based on the pose data, to obtain two-dimensional image coordinates that are corresponding to the first point cloud data and that are in an image coordinate system of the first image; and obtain the two-dimensional feature image based on an image block or an image feature point descriptor corresponding to the two-dimensional image coordinates and in the first image.

11. The terminal of claim 10, wherein the spatial positioning engine is further configured to:

obtain the pose data of the terminal in the first camera coordinate system based on the first image and motion data that is collected by an inertial measurement unit IMU.

12. The terminal of claim 10, wherein the terminal further comprises a positioner configured to obtain positioning data comprising at least one of GPS positioning data of the terminal, BeiDou positioning data of the terminal, Wi-Fi positioning data of the terminal, Bluetooth positioning data of the terminal, or base station positioning data of the terminal; and wherein the map data generated by the map generator further carries the positioning data.

13. The terminal of claim 10, wherein the virtual scenario is one of a virtual reality (VR) scenario, an augmented reality (AR) scenario, or a mixed reality (MR) scenario.

14. A data processing terminal used in a virtual scenario, comprising:

a communication interface configured to receive map data from another terminal, wherein the map data is generated based on first point cloud data of an object, pose data of the another terminal in a first camera coordinate system of the another terminal, and a two-dimensional feature image of the another terminal, and the first point cloud data indicates three-dimensional coordinate values of a surface point of the object in the first camera coordinate system of the another terminal;

an spatial positioning engine configured to obtain pose data of the terminal in a second camera coordinate system of the terminal; and obtain a two-dimensional feature image of the terminal;

a coordinate system transformer configured to obtain coordinate system transformation data between the first camera coordinate system and the second camera coordinate system based on the map data, the pose data of the terminal in the second camera coordinate system, and the two-dimensional feature image of the terminal; and a content synchronizer configured to synchronize content in the virtual scenario based on the coordinate system transformation data.

15. The terminal of claim 14, wherein the coordinate system transformer is further configured to:

perform a feature matching operation in the map data using the two-dimensional feature image of the terminal, to obtain pose data of the terminal in the first camera coordinate system; and obtain the coordinate system transformation data between the first camera coordinate system and the second camera coordinate system based on the pose data of the terminal in the first camera coordinate system and the pose data of the terminal in the second camera coordinate system.

16. The terminal of claim 14, further comprising:

a camera configured to collect a second image comprises an image of the object;

wherein the spatial positioning engine is further configured to obtain second point cloud data of the object based on the second image, wherein the second point cloud data indicates three-dimensional coordinate values of a surface point of the object in the second camera coordinate system;

obtain the pose data of the terminal in the second camera coordinate system based on the second image;

project the second point cloud data onto the second image based on the pose data of the terminal in the second camera coordinate system, to obtain two-dimensional image coordinates that are corresponding to the second point cloud data and that are in an image coordinate system of the second image; and obtain the two-dimensional feature image of the terminal based on an image block or an image feature point descriptor corresponding to the two-dimensional image coordinates and in the second image.

17. The terminal of claim 14, wherein the content synchronizer is further configured to:

obtain pose transformation data of an anchor in the virtual scenario based on the coordinate system transformation data; and synchronize the content in the virtual scenario based on the pose transformation data of the anchor.

18. The terminal of claim 14, wherein the map data further carries positioning data, and the positioning data comprises at least one of GPS positioning data of the another terminal, BeiDou positioning data of the another terminal, Wi-Fi positioning data of the another terminal, Bluetooth positioning data of the another terminal, or base station positioning data of the another terminal; wherein the spatial positioning engine is further configured to obtain a two-dimensional feature image of the terminal based on the positioning data.

* * * * *